United States Patent
Itani et al.

(10) Patent No.: US 10,740,743 B2
(45) Date of Patent: Aug. 11, 2020

(54) INFORMATION PROCESSING DEVICE AND SCREEN SETTING METHOD

(71) Applicant: NEC Corporation, Tokyo (JP)

(72) Inventors: Tadashi Itani, Tokyo (JP); Rumi Ikezawa, Tokyo (JP)

(73) Assignee: NEC Corporation, Tokyo (JP)

( * ) Notice: Subject to any disclaimer, the term of this patent is extended or adjusted under 35 U.S.C. 154(b) by 282 days.

(21) Appl. No.: 15/389,105

(22) Filed: Dec. 22, 2016

(65) Prior Publication Data

US 2017/0116591 A1 Apr. 27, 2017

Related U.S. Application Data

(62) Division of application No. 14/418,653, filed as application No. PCT/JP2013/002137 on Mar. 28, 2013, now abandoned.

(30) Foreign Application Priority Data

Aug. 3, 2012 (JP) .................................. 2012-173402

(51) Int. Cl.
*G06Q 20/20* (2012.01)
*G07G 1/12* (2006.01)
(Continued)

(52) U.S. Cl.
CPC ......... *G06Q 20/208* (2013.01); *G06F 3/0488* (2013.01); *G06F 3/04842* (2013.01);
(Continued)

(58) Field of Classification Search
None
See application file for complete search history.

(56) References Cited

U.S. PATENT DOCUMENTS

| | | | |
|---|---|---|---|
| 5,426,202 A | 6/1995 | Vallerien |
| 5,494,136 A | 2/1996 | Humble |
| (Continued) | | |

FOREIGN PATENT DOCUMENTS

| | | |
|---|---|---|
| JP | 1-310498 | 12/1989 |
| JP | 4-42718 | 7/1992 |
| (Continued) | | |

OTHER PUBLICATIONS

Office Action issued by the Japanese Patent Office in counterpart Japanese Patent Application No. 2014-527945, dated Oct. 27, 2015.
(Continued)

*Primary Examiner* — Peter Ludwig
(74) *Attorney, Agent, or Firm* — Finnegan, Henderson, Farabow, Garrett & Dunner, L.L.P.

(57) ABSTRACT

An information processing device includes: a retaining unit that retains a product image acquired from an image capturing unit that captures an image of a product to be registered as an item to be checked out; a storage unit that stores, for each product, panel registration information including a product code, a product image, and screen layout information; a processing unit that causes a display unit to display a checkout panel screen in which each screen part enables to register each product as an item to be checked out, contains the product image, and is arranged according to screen layout information; and a processing unit that acquires a product image of an unspecified product from the image retaining unit, acquires a product code and screen layout information concerning this unspecified product, and stores the acquired product code, the acquired screen layout information, and the product image acquired from the retaining unit, in the panel information storage unit as the panel registration information concerning the unspecified product.

12 Claims, 16 Drawing Sheets

(51) Int. Cl.
*G07G 1/14* (2006.01)
*G06Q 30/06* (2012.01)
*G07G 1/01* (2006.01)
*G07G 1/00* (2006.01)
*G06F 3/0488* (2013.01)
*G06K 9/78* (2006.01)
*G06T 11/60* (2006.01)
*G06F 3/0484* (2013.01)

(52) U.S. Cl.
CPC ........... *G06F 3/04886* (2013.01); *G06K 9/78* (2013.01); *G06Q 20/206* (2013.01); *G06Q 30/06* (2013.01); *G06T 11/60* (2013.01); *G07G 1/0054* (2013.01); *G07G 1/01* (2013.01); *G07G 1/12* (2013.01); *G07G 1/14* (2013.01); *G06T 2200/24* (2013.01)

(56) References Cited

U.S. PATENT DOCUMENTS

| | | | | |
|---|---|---|---|---|
| 5,609,223 | A * | 3/1997 | Iizaka | A47F 9/046 186/61 |
| 5,679,941 | A | 10/1997 | Iizaka et al. | |
| 5,818,528 | A * | 10/1998 | Roth | G06K 7/10732 348/364 |
| 5,969,317 | A * | 10/1999 | Espy | G06K 9/00 235/378 |
| 5,992,570 | A * | 11/1999 | Walter | A47F 9/048 186/36 |
| 6,105,866 | A | 8/2000 | Morrison et al. | |
| 6,418,414 | B1 * | 7/2002 | Lutz | A47F 9/046 705/16 |
| 6,435,407 | B1 | 8/2002 | Fiordelisi | |
| 6,577,983 | B1 * | 6/2003 | Zhu | G06K 9/00 702/128 |
| 6,580,440 | B1 * | 6/2003 | Wagner | G06F 9/451 715/762 |
| 6,592,033 | B2 * | 7/2003 | Jennings | G06K 9/00 235/378 |
| 6,606,579 | B1 * | 8/2003 | Gu | G01G 19/4144 235/385 |
| 6,957,775 | B2 | 10/2005 | Tsikos et al. | |
| 7,168,525 | B1 * | 1/2007 | Jacobs | G06Q 20/203 186/61 |
| 7,578,442 | B2 * | 8/2009 | Knowles | G06K 7/10693 235/383 |
| 7,878,416 | B2 | 2/2011 | Lapstun et al. | |
| 8,106,775 | B2 * | 1/2012 | Ohkawa | G06Q 20/208 340/10.1 |
| 8,117,071 | B1 * | 2/2012 | Fitch | G06Q 20/201 235/462.01 |
| 8,474,715 | B2 | 7/2013 | Goncalves | |
| 8,494,909 | B2 * | 7/2013 | Goncalves | G06Q 20/203 382/100 |
| 8,794,524 | B2 | 8/2014 | Connell, II et al. | |
| 8,944,324 | B2 * | 2/2015 | Iizaka | G07G 1/0045 235/383 |
| 2002/0138374 | A1 | 9/2002 | Jennings et al. | |
| 2002/0194074 | A1 | 12/2002 | Jacobs | |
| 2003/0120612 | A1 | 6/2003 | Fujisawa et al. | |
| 2007/0278298 | A1 * | 12/2007 | Ali | G06Q 20/20 235/383 |
| 2008/0149725 | A1 | 6/2008 | Rosenbaum | |
| 2009/0039164 | A1 | 2/2009 | Herwig et al. | |
| 2009/0121017 | A1 | 5/2009 | Cato et al. | |
| 2012/0037699 | A1 * | 2/2012 | Sugita | G06Q 30/06 235/383 |
| 2012/0041777 | A1 | 2/2012 | Case et al. | |
| 2012/0054052 | A1 | 3/2012 | Wakebe | |
| 2013/0048721 | A1 | 2/2013 | Rasband et al. | |
| 2013/0193210 | A1 * | 8/2013 | Iizaka | G06K 7/0004 235/454 |

FOREIGN PATENT DOCUMENTS

| | | |
|---|---|---|
| JP | 2005-141485 | 6/2005 |
| JP | 2006-277198 | 10/2006 |
| JP | 2012-22471 | 2/2012 |
| JP | 2012-43210 | 3/2012 |
| JP | 2012-53731 | 3/2012 |
| JP | 2012-53891 | 3/2012 |
| JP | 2012-59249 | 3/2012 |

OTHER PUBLICATIONS

International Search Report and Written Opinion dated Jun. 25, 2013, in corresponding PCT International Application.

* cited by examiner

INFORMATION PROCESSING DEVICE AND SCREEN SETTING METHOD

CROSS-REFERENCE TO RELATED PATENT APPLICATIONS

This application is a continuation of U.S. application Ser. No. 14/418,653, filed on Jan. 30, 2015, which is a National Stage Entry of International Application No. PCT/JP2013/002137, filed Mar. 28, 2013, which claims priority from Japanese Patent Application No. 2012-173402, filed Aug. 3, 2012. The entire contents of the above-referenced applications are expressly incorporated herein by reference.

TECHNICAL FIELD

The present invention relates to a POS (point of sale) terminal and a POS system.

BACKGROUND ART

At a cash register in retail stores such as supermarkets, department stores, and convenience stores, a POS terminal reads a product identification label such as a bar code attached on a package of a product, and the product is checked out. However, there are products such as vegetables and fruits to which a product identification label is difficult to be attached in a readable manner, and products such as a bag of rice and a box of beer of which product identification label is difficult to be read at the cash register. These products cannot be checked out using the product identification label in the manner as described above, and hence, a POS terminal displays a checkout panel screen in which product buttons corresponding to these products are arranged. A register operator operates this checkout panel screen through a touch panel, thereby checking out a product corresponding to the product button operated. Hereinafter, a product, which is checked out through the checkout panel screen without using the product identification label, is also referred to as an unlabeled product.

Patent Document 1 described below proposes a technique that allows a user to freely and easily change the layout of screen parts corresponding to respective products on an order input screen. Patent Document 2 described below proposes a method of, if a product that has not been registered in a product master is found, scanning a bar code on the product while capturing an image of the product in order to make it easy to register the product in the product master at some time in the future using the image of the product captured. Patent Document 3 described below proposes a method of, if product register information corresponding to a product code is not registered in a PLU file, setting a product image captured by a scanner and an inputted unit price for the product code, and additionally registering it to the PLU file.

RELATED DOCUMENT

Patent Document

Patent Document 1: Japanese Patent Application Laid-open No. 2012-43210
Patent Document 2: Japanese Examined Patent Application Publication No. H4-42718
Patent Document 3: Japanese Patent Application Laid-open No. 2006-277198

SUMMARY OF THE INVENTION

Problem to be Solved by the Invention

The unlabeled products are registered to the checkout panel screen through a POS managing device placed in an office of a store or the like, and the registered information is usually distributed from the POS managing device to each POS terminal before the store is opened. However, there may exist an unlabeled product that has not been registered on the checkout panel screen, for example, due to forgetting to register. In such a case, this unlabeled product has to be registered through the POS managing device, and the registered information has to be distributed to each of the POS terminals. Note that none of the methods proposed in the related art documents described above relates to registration of unlabeled products to the checkout panel screen as described above.

In the meanwhile, in order to easily identify a correspondence relationship between a product button on the checkout panel screen and a corresponding product, it can be considered that an image of the product is displayed on the product button. However, for such registration of the product image to the panel screen, it is necessary to make a preparation of, for example, the product image, and it is conceived that much manpower is necessary.

The present invention has been made in view of the circumstances as described above, and an object of the present invention is to provide a technique that allows a user to easily set a checkout panel screen used to register each product as an item to be checked out.

Means for Solving the Problem

Each aspect of the present invention employs the following configurations in order to solve the problem described above.

A first aspect relates to an information processing device. The information processing device according to the first aspect includes: an image retaining unit that retains a product image acquired from an image capturing unit that captures an image of a product to be registered as an item to be checked out; a panel information storage unit that stores, for each product, panel registration information which includes a product code with which the product can be identified, a product image, and screen layout information; a display processing unit that, on the basis of the panel registration information on each product stored in the panel information storage unit, causes a display unit to display a checkout panel screen in which each screen part enables to register each product as the item to be checked out, contains the product image and is arranged according to the screen layout information; and a maintenance processing unit that acquires, from the image retaining unit, a product image of an unspecified product for which panel registration information has not been stored in the panel information storage unit, acquires a product code and screen layout information concerning this unspecified product, and stores the acquired product code, the acquired screen layout information, and the product image acquired from the image retaining unit, in the panel information storage unit as the panel registration information concerning the unspecified product.

A second aspect relates to a method for setting a screen performed by an information processing device and used for setting a checkout panel screen in which each screen part is arranged to be able to register each product as an item to be checked out. The screen setting method according to the second aspect includes: acquiring, from an image capturing unit that captures an image of a product to be registered as an item to be checked out, a product image of an unspecified product for which panel registration information is not stored in a panel information storage unit that stores, for each product, panel registration information which includes a product code with which the product can be identified, a product image, and screen layout information; acquiring the product code and the screen layout information concerning the unspecified product; storing the product code, the screen layout information, and the product image, each of which relates to the unspecified product, in the panel information storage unit as the panel registration information on the unspecified product; and on the basis of the screen layout information and the product image of the unspecified product stored in the panel information storage unit, causing a display unit to display the checkout panel screen in which a screen part corresponding to the unspecified product contains this product image, and is arranged according to this screen layout information.

It should be noted that other aspects of the present invention may include a program that causes the information processing device to realize the configuration of the first aspect described above, or may include a computer-readable storage medium that records such a program. This storage medium includes a non-transitory tangible medium.

Effect of the Invention

According to each of the aspects described above, it is possible to allow a user to easily set the checkout panel screen used to register each product as an item to be checked out.

BRIEF DESCRIPTION OF THE DRAWINGS

The above-described object, other objects, features and advantages will be made further clear by the preferred exemplary embodiments described below and the following drawings attached thereto.

DESCRIPTION OF EMBODIMENTS

Hereinbelow, embodiments according to the present invention will be described. Note that each exemplary embodiment described below is merely an example, and the present invention is not limited to configurations of each of the exemplary embodiments described below.

First Exemplary Embodiment

[Device Configuration]

Figure 1:
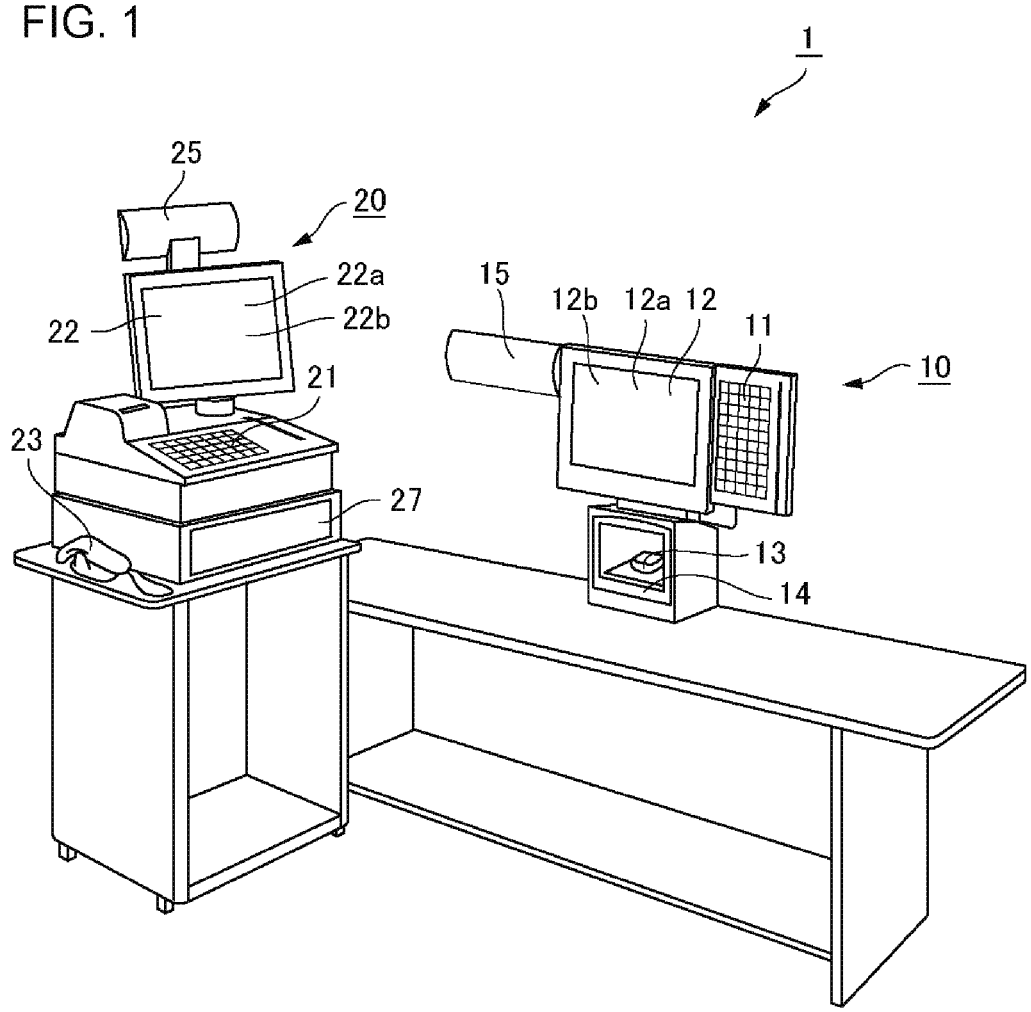
FIG. 1 is a diagram illustrating an example of a configuration of an appearance of a POS register device according to a first exemplary embodiment.

FIG. 1 is a diagram illustrating an example of a configuration of an appearance of a POS register device according to a first exemplary embodiment. As illustrated in FIG. 1, the POS register device 1 according to the first exemplary embodiment includes a checker device 10 and a cashier device 20. The POS register device 1, the checker device 10, and the cashier device 20 are also called POS terminals.

The checker device 10 registers a product as an item to be checked out, and transmits information on a product to be checked out to the cashier device 20. The checker device 10 includes, for example, a keyboard 11, a touch panel unit 12, a scanning device 13, and a purchaser display 15. The purchaser display 15 displays, for example, selling price information on a product registered as the item to be checked out.

The touch panel unit 12 includes, for example, a display unit 12a, a touch panel 12b that accepts user operations, and a controlling unit. The touch panel unit 12 causes the display unit 12a to display a screen corresponding to received drawing data, and receives an input from a user (store staff such as a register operator) by sensing touch to the touch panel 12b from the outside. The touch panel unit 12 transmits the input information acquired. The display unit 12a displays, for example, information concerning a product registered as an item to be checked out, and a checkout panel screen.

The checkout panel screen is a screen used for registering each product as an item to be checked out without using the product identification label described above. On the checkout panel screen, screen parts corresponding to respective products that are to be registered as items to be checked out without using the product identification label are arranged. Details of this checkout panel screen will be described later. Furthermore, as described above, a product that is checked out using the checkout panel screen without using the product identification label is also referred to as an unlabeled product. Thus, the unlabeled product not only includes a product that does not have the product identification label attached thereto but also includes a product that is checked out using the checkout panel screen even if the product identification label is attached thereto. If a screen part on the checkout panel screen is operated through the touch panel 12b in a state where the checkout panel screen is displayed on the display unit 12a, an unlabeled product corresponding to the screen part operated is registered as the item to be checked out.

The scanning device 13 detects a product identification label attached on a package of a product held up over a scanning window 14, and furthermore, captures a product image showing the appearance of this product. The scanning device 13 is also called an image capturing unit. More specifically, the scanning device 13 forms an optical image on image sensors such as charge coupled devices (CCD) on the basis of lights from the product through the scanning window 14, and acquires image data on this product on the basis of electrical signals corresponding to this image. The scanning device 13 may detect the product identification label from the product image captured by the image sensor. In this case, the scanning device 13 has a function of automatically adjusting a focal length, an angle of view or the like at the time of capturing the product image as well as at the time of capturing an image of the product identification label. Furthermore, the scanning device 13 may further include a laser scanner, and detect the product identification label using this laser scanner.

Here, the product identification label represents a code symbol in which a product code, which is formed by characters, numbers, symbols, or the like and from which each product can be identified, is encoded, and is realized, for example, with a one-dimensional bar code or a two-dimensional bar code. This exemplary embodiment does not limit the way in which the product identification label is realized, provided that the product code can be extracted from the product identification label. The scanning device 13 extracts the product code by decoding the detected product identification label.

As described above, the checker device 10 recognizes the product on the basis of a product code extracted from the product identification label using the scanning device 13, a product code acquired by operation of the checkout panel screen, or a product code (or section code) directly inputted using, for example, the keyboard 11, and registers this product as the item to be checked out.

The cashier device 20 performs settlement processing for a product to be checked out. Basically, as described above, the checker device 10 registers an item to be checked out. However, the cashier device 20 itself may additionally register the item to be checked out. In such a case, the cashier device 20 recognizes the product on the basis of a product code extracted from the product identification label using a handheld scanner 23, a product code acquired by operation of the checkout panel screen, or a product code (or section code) directly inputted using, for example, a keyboard 21, and additionally registers this product as the item to be checked out.

The cashier device 20 includes, for example, the keyboard 21, a touch panel unit 22, the handheld scanner 23, a purchaser display 25, and a cash drawer 27. The cash drawer 27 keeps paper money, coins, cash voucher or other form of money used in settlement of products.

The touch panel unit 22 has a configuration similar to that of the touch panel unit 12 described above, and the touch panel unit 22 includes, for example, a display unit 22a, and a touch panel 22b. The display unit 22a displays, for example, a screen concerning settlement processing of products registered as the item to be checked out, and a checkout panel screen. The purchaser display 25 displays, for example, the total purchase price, and the amount of change.

The handheld scanner 23 reads the product identification label attached to a package of the product as is the case with the scanning device 13 described above, and furthermore, captures a product image showing the appearance of the product. The handheld scanner 23 is also called an image capturing unit. It is only necessary that the handheld scanner 23 has a configuration similar to that of the scanning device 13 described above, and hence, explanation thereof will not be repeated.

Figure 2:
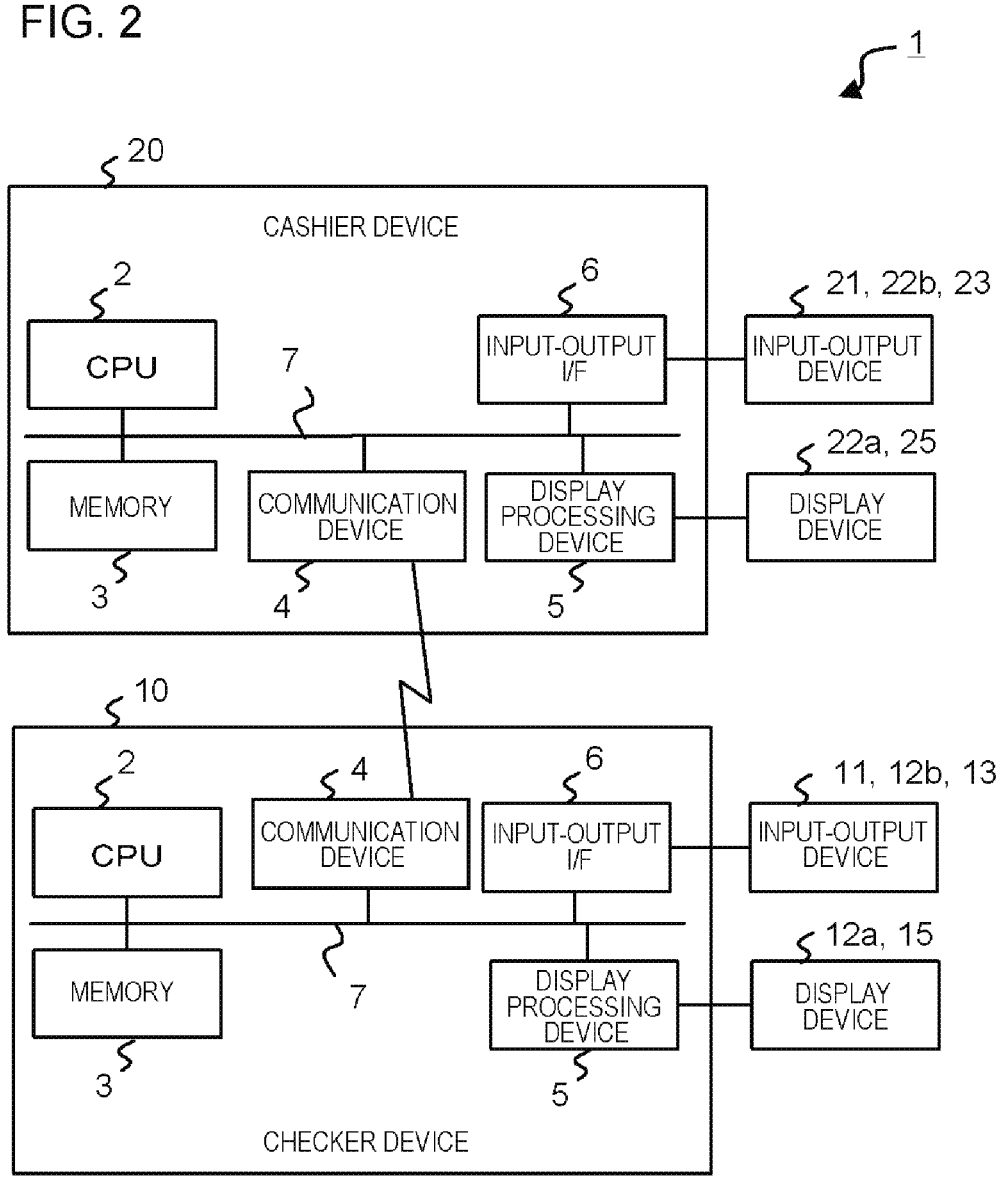
FIG. 2 is a diagram schematically illustrating an example of a hardware configuration of the POS register device according to the first exemplary embodiment.

FIG. 2 is a diagram schematically illustrating an example of a hardware configuration of the POS register device 1 according to the first exemplary embodiment. As illustrated in FIG. 2, the checker device 10 includes, for example, a central processing unit (CPU) 2, a memory 3, a communication device 4, a display processing device 5, and an input-output interface (I/F) 6. Each of these units is connected, for example, with a bus 7. The memory 3 includes, for example, a random access memory (RAM), a read only memory (ROM), a hard disk, and a portable storage medium. The communication device 4 communicates with other devices such as the cashier device 20 by radio or by wire.

The display processing device 5 is connected with a display device, and transmits, to the display device, a screen-displaying signal for displaying a given screen in accordance with a process performed by a CPU 2. The checker device 10 includes the purchaser display 15 and the display unit 12a of the touch panel unit 12, each of which serves as the display device.

The input-output I/F 6 is connected with an input-output device, outputs, for example, voice to an output device in accordance with a process performed by the CPU 2, and receives an input signal from an input device. The checker device 10 includes the keyboard 11, the touch panel 12b of the touch panel unit 12, and the scanning device 13, each of which serves as the input-output device.

The cashier device 20 includes, for example, the CPU 2, a memory 3, a communication device 4, a display processing device 5, and an input-output I/F 6 as is the case with the checker device 10. The cashier device 20 includes the purchaser display 25 and the display unit 22a of the touch panel unit 22, each of which serves as the display device. The cashier device 20 includes the keyboard 21, the touch panel 22b of the touch panel unit 22, and the handheld scanner 23, each of which serves as the input-output device.

It should be noted that this exemplary embodiment does not limit the hardware configurations of the checker device 10 and the cashier device 20 described above. For example, the keyboards 11 and 21 may be replaced with a software keyboard. Furthermore, the purchaser displays 15 and 25 may be integrated as one unit, or may be a display that displays things equivalent to those displayed on the display unit 12a of the touch panel unit 12 and the display unit 22a of the touch panel unit 22.

[Process Configuration]

Figure 3:
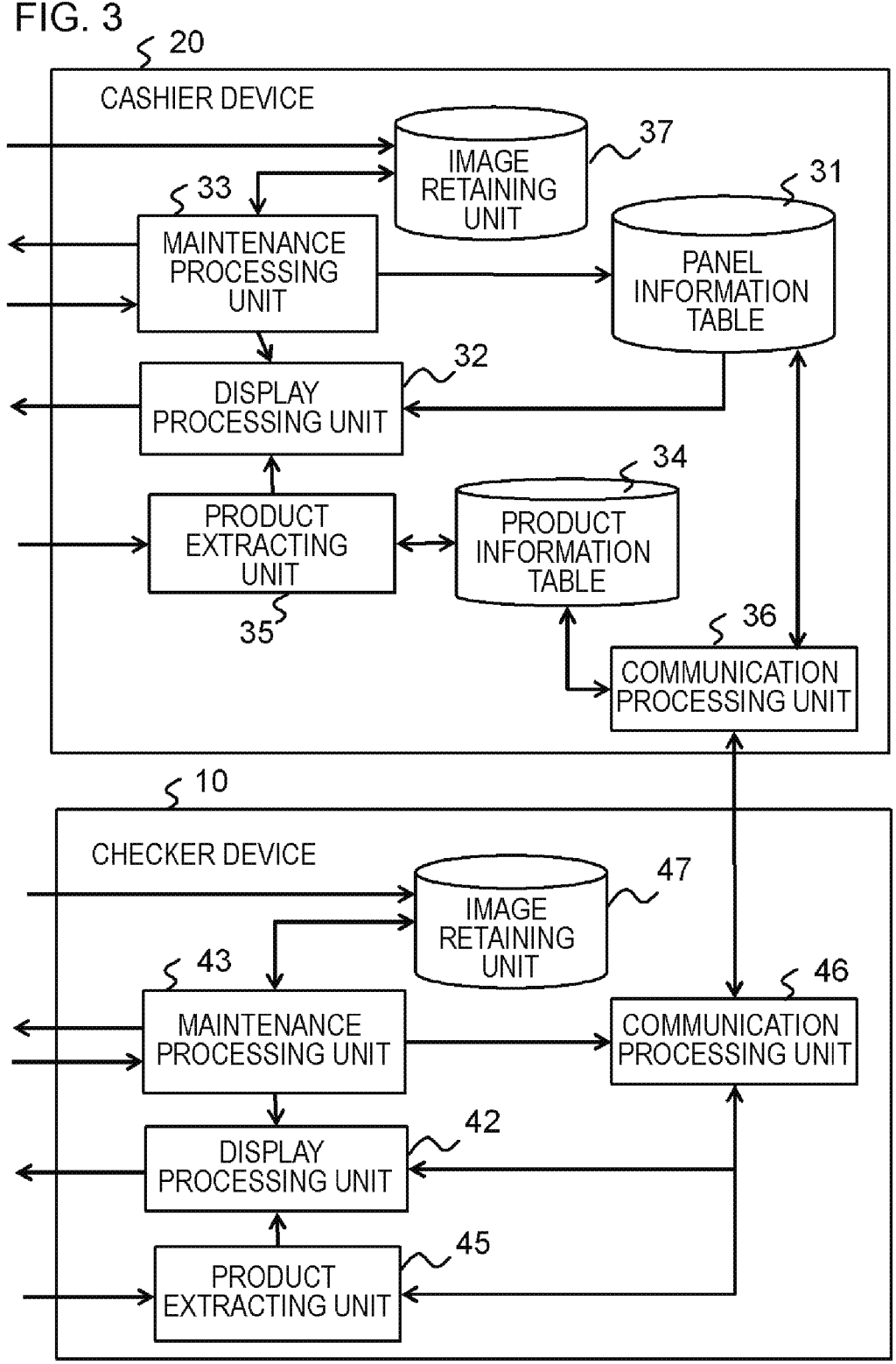
FIG. 3 is a diagram schematically illustrating an example of a process configuration of part of the POS register device according to the first exemplary embodiment.

FIG. 3 is a diagram schematically illustrating an example of a process configuration of part of the POS register device 1 according to the first exemplary embodiment. In FIG. 3, only the process configuration related to the checkout panel screen is illustrated, and the checker device 10 and the cashier device 20 each have a large number of processing units other than those illustrated in the drawing.

[Cashier Device]

The cashier device 20 includes, for example, a panel information table 31, a display processing unit 32, a maintenance processing unit 33, a product information table 34, a product extracting unit 35, a communication processing unit 36, and an image retaining unit 37. Each of these processing units is realized, for example, with the CPU 2 running a program stored in the memory 3. Furthermore, this program may be installed, for example, from a portable storage medium such as a compact disc (CD) and a memory card, or other device, and be stored in the memory 3.

The panel information table 31 stores configuration information concerning the checkout panel screen. More specifically, for each unlabeled product that is supposed to be displayed on the checkout panel screen, the panel information table 31 stores panel registration information including a product code with which this product can be identified, a product image, and screen layout information. Thus, the panel information table 31 is also called a panel information storage unit.

The product code is identification data formed, for example, by characters, numbers, and symbols determined in advance for identifying each product. For the product code, a Price Look Up (PLU) code, a Non-PLU code, and the like are used, for example. Furthermore, for the product code read using the product identification label, a Japan Article Number (JAN) code is used, for example. The screen layout information represents information including the position and size of a screen part corresponding to the product in the checkout panel screen.

The display processing unit 32 causes the display unit 22a to display a checkout panel screen on the basis of panel registration information on each unlabeled product stored in the panel information table 31. More specifically, on the basis of the panel registration information on each product stored in the panel information table 31, the display processing unit 32 generates drawing data which corresponds to the checkout panel screen and in which screen parts, with which the product can be registered as the item to be checked out, each contain a product image and are arranged in accordance with screen layout information, and transmits this drawing data to the display processing device 5. As a result, with control by the display processing device 5, the checkout panel screen is displayed on the display unit 22a.

Figure 4:
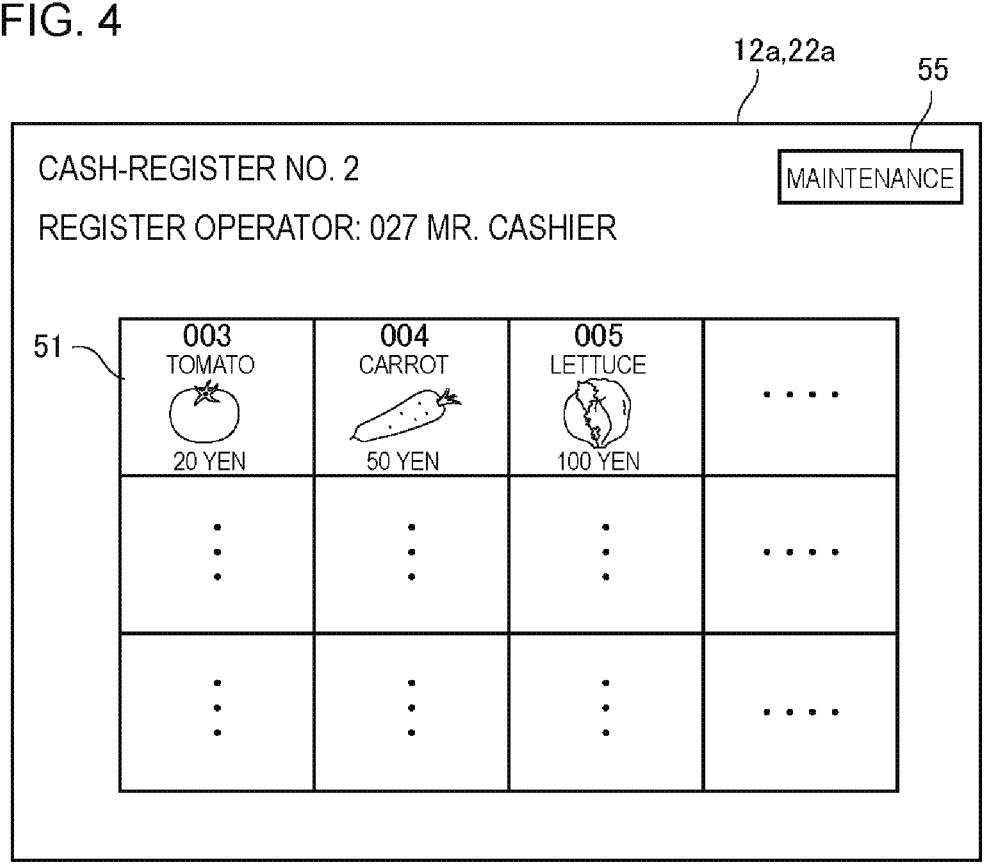
FIG. 4 is a diagram illustrating an example of a checkout panel screen.

FIG. 4 is a diagram illustrating an example of the checkout panel screen. In the example illustrated in FIG. 4, buttons are used as screen parts with which unlabeled products can be registered as items to be checked out. An unlabeled product stored in the panel information table 31 is set to each of the buttons, and each of the buttons displays part of a product code, a product name, a product image, and selling price information on each of the unlabeled products. In the example illustrated in FIG. 4, a screen part (button) 51 relates to a tomato, and displays part of a product code (003), a product name (tomato), a product image (image of the tomato), and selling price information (20 yen). On the checkout panel screen, a user selects a button corresponding to an unlabeled product that is to be registered as an item to be checked out by touching the touch panel 12b. With this operation, in the cashier device 20, a processing unit, not illustrated, registers the selected unlabeled product as an item to be checked out.

The image retaining unit 37 stores product images of unlabeled products captured by the handheld scanner 23. The handheld scanner 23 captures images of products, for example, in response to a predetermined operation performed by a user to a predetermined screen displayed on the display unit 22a.

The maintenance processing unit 33 performs processing for registering (displaying), to the checkout panel screen, an unspecified product for which panel registration information has not been stored in the panel information table 31. More specifically, the maintenance processing unit 33 extracts a product image of this unspecified product from the image retaining unit 37, acquires a product code and screen layout information on the unspecified product, and stores the acquired product code and the acquired screen layout information and the product image extracted from the image retaining unit 37, in the panel information table 31 as the panel registration information on the unspecified product. Hereinafter, a product that is an unlabeled product but has not been registered to the checkout panel screen is also referred to as an unspecified product.

For example, it may be possible to employ a configuration in which the maintenance processing unit 33 instructs the display processing unit 32 to cause the display unit 22a to display an input screen for a user to input a product code and screen layout information concerning an unspecified product and select a product image of the unspecified product, in order to acquire the product code, the screen layout information, and the product image of the unspecified product. In this case, the display processing unit 32 generates drawing data on this input screen, and transmits it to the display processing device 5.

Figure 5:
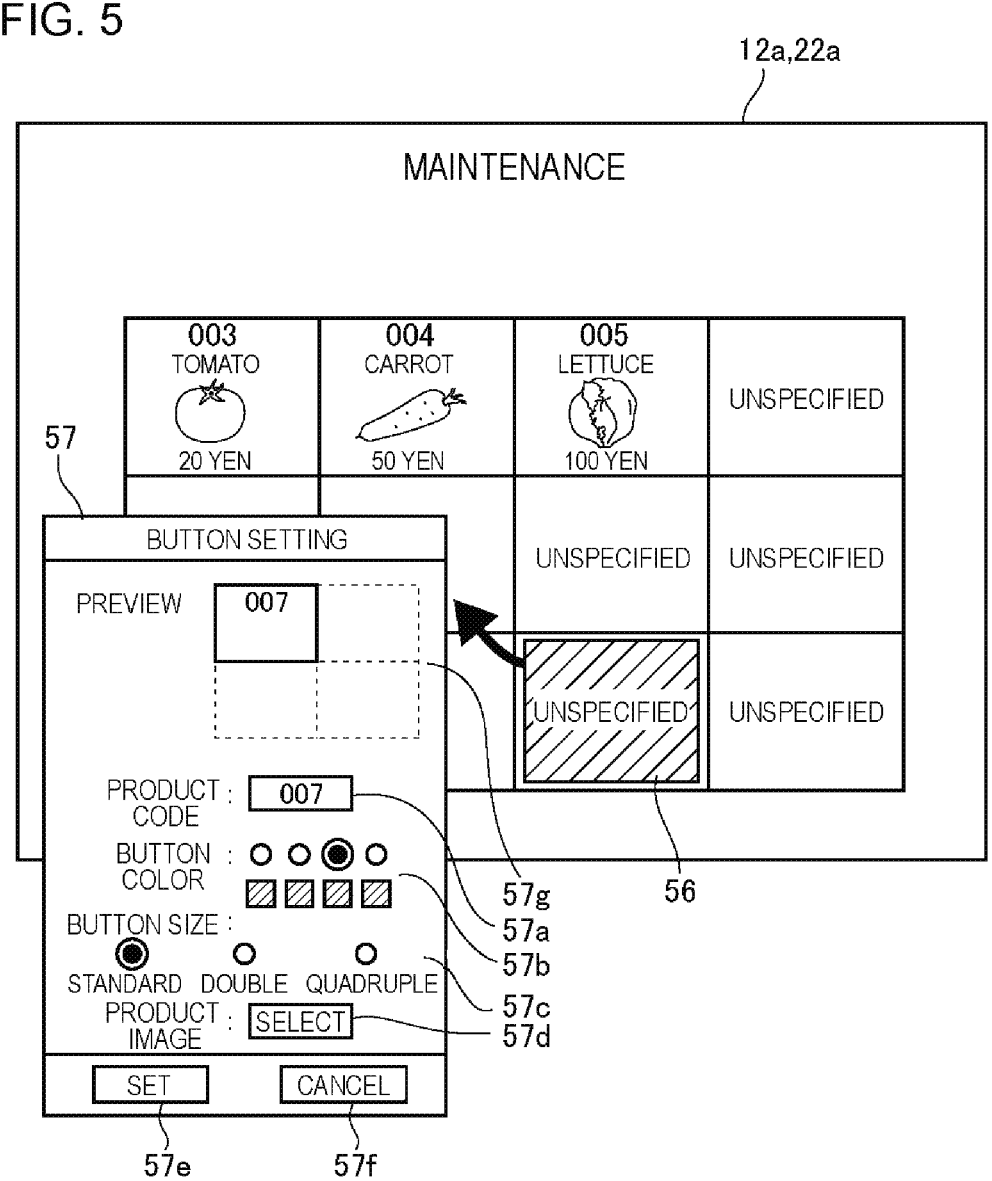
FIG. 5 is a diagram illustrating an example of an input screen.

FIG. 5 is a diagram illustrating an example of an input screen. FIG. 5 illustrates a maintenance screen and a button setting screen as an input screen. For example, as a maintenance button 55 is pressed on the checkout panel screen illustrated in FIG. 4, the maintenance screen illustrated in FIG. 5 is displayed. On the maintenance screen, areas to which no product has been allocated are shown as "unspecified," and when one of the areas (reference character 56 in FIG. 5) is selected, a button setting screen 57 is displayed. The button setting screen 57 includes, for example, a product-code input box 57a, a button-color selection field 57b, a button-size selection field 57c, a product-image selection button 57d, a setting button 57e, a cancel button 57f, and a preview section 57g.

In this case, the maintenance processing unit 33 acquires data inputted into the product-code input box 57a as a product code, and further acquires data specified in the button-color selection field 57b and the button-size selection field 57c on the button setting screen 57, and data specified in an area 56 selected on the maintenance screen, as screen layout information. Furthermore, if the product-image selection button 57d on the button setting screen 57 is selected, product images retained by the image retaining unit 37 are displayed, and a user selects one product image from the display. The maintenance processing unit 33 acquires the product image selected as a product image on the unspecified product. The maintenance processing unit 33 may delete the selected product image from the image retaining unit 37.

The product information table 34 stores, for each product, product information including a product code, a product name, a section code with which a category to which the product belongs can be identified, and selling price information. The section code indicates a category to which the product belongs, and includes a vegetable section, an alcoholic drink section, and a fresh fish section. The product information on each product stored in the product information table 34 is determined in advance, and is transmitted to the POS register device 1 from, for example, a POS managing device (not illustrated), which is connected to the POS register device 1 in a manner that they can communicate with each other. The product information table 34 is also called a product information storage unit The product extracting unit 35 performs processing for assisting the user to easily identify the product code of the unspecified product. More specifically, the product extracting unit 35 allows the user to identify the product code of the unspecified product from a product code list narrowed down on the basis of the section codes and selling price information. This is because, for the user, the section code and the selling price can be recognized more easily than the product code.

The product extracting unit 35 acquires the section code and the selling price information concerning the unspecified product, and extracts, from the product information table 34, a product code and a product name of at least one product assumed to be the unspecified product on the basis of the section code and the selling price information acquired, thereby causing the display unit 22a to display a product selection screen indicating the product name of the at least one product extracted. In order to acquire the section code and the selling price information concerning the unspecified product, the product extracting unit 35 may instruct the display processing unit 32 to cause the display unit 22a to display an input screen for the user to input the section code and the selling price information.

Figure 6:
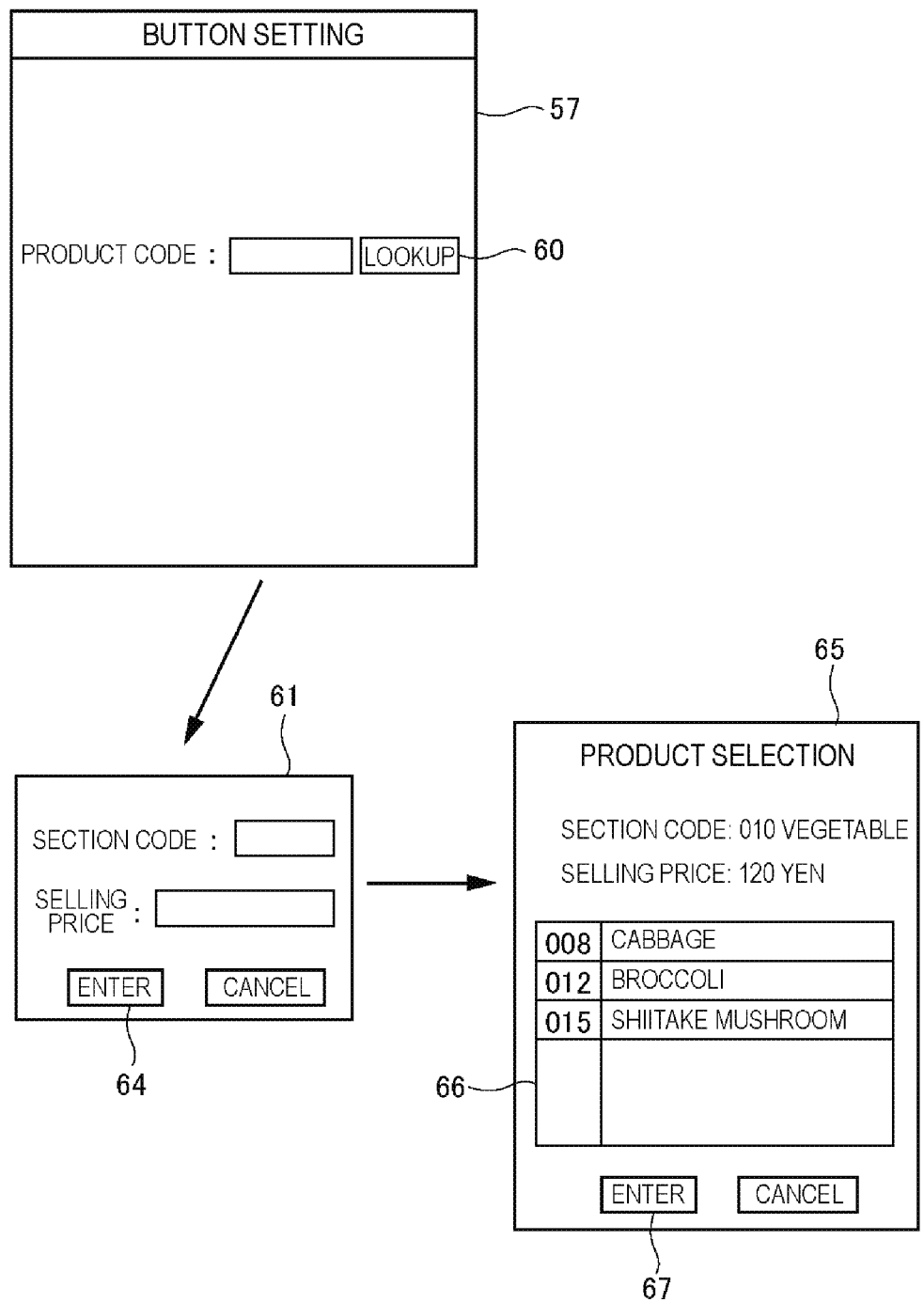
FIG. 6 is a diagram illustrating an example of a product selection screen according to the first exemplary embodiment.

FIG. 6 is a diagram illustrating an example of a product selection screen according to the first exemplary embodiment. A lookup button 60 is provided on the button setting screen 57, and as this lookup button 60 is pressed, an input screen 61 for the section code and the selling price information is displayed. Once the section code and the selling price information are inputted, for example, through the keyboard 21 on the input screen 61, and an enter button 64 is pressed, a product selection screen 65 is displayed. On the product selection screen 65, a list 66 of product information extracted by the product extracting unit 35 from the product information table 34 is displayed on the basis of the section code and the selling price information inputted through the input screen 61. In the example illustrated in FIG. 6, a list of product information corresponding to a section code (010) and a selling price (120 yen) is displayed. The user selects an unspecified product from the list 66 on this product selection screen 65, and presses an enter button 67. With these operations, a product code of the product selected from the list 66 is set in the product-code input box 57a on the button setting screen 57. As a result, the maintenance processing unit 33 can acquire the product code of the product selected on the product selection screen 65 as the product code of the unspecified product.

The communication processing unit 36 controls communication between the cashier device 20 and the checker device 10. More specifically, in response to a request from the checker device 10, the communication processing unit 36 transmits information stored in the panel information table 31 and the product information table 34 to the checker device 10, and updates information stored in the panel information table 31 and the product information table 34 on the basis of information transmitted from the checker device 10. Furthermore, the communication processing unit 36 receives information on a product registered by the checker device 10 as an item to be checked out.

[Checker Device]

As illustrated in FIG. 3, the checker device 10 includes, for example, a display processing unit 42, a maintenance processing unit 43, a product extracting unit 45, a communication processing unit 46, and an image retaining unit 47. Each of these processing units is realized, for example, with the CPU 2 running a program stored in the memory 3. Furthermore, this program may be installed, for example, from a portable storage medium such as a compact disc (CD) and a memory card or other device, and be stored in the memory 3.

In the example illustrated in FIG. 3, the checker device 10 does not have the panel information table 31 and the product information table 34, and hence, the communication processing unit 46 acquires information stored in the panel information table 31 and the product information table 34 from the cashier device 20. Furthermore, in response to a request from other processing units, the communication processing unit 46 transmits, to the cashier device 20, information for updating the panel information table 31 and the product information table 34.

Basically, the display processing unit 42, the maintenance processing unit 43, the product extracting unit 45, and the image retaining unit 47 are similar to the display processing unit 32, the maintenance processing unit 33, the product extracting unit 35, and the image retaining unit 37 described above. Below, these processing units of the checker device 10 will be described only for things different from those of the cashier device 20.

The display processing unit 42 causes the display unit 12a to display a checkout panel screen on the basis of information in the panel information table 31 acquired by the communication processing unit 46 from the cashier device 20.

The image retaining unit 47 stores a product image of an unlabeled product captured by the scanning device 13. The scanning device 13 captures an image of a product, for example, in response to a predetermined operation performed by a user to a predetermined screen displayed on the display unit 12a.

The maintenance processing unit 43 extracts a product image of an unspecified product from the image retaining unit 47, acquires a product code and screen layout information concerning this unspecified product, and transmits the acquired product code, the acquired screen layout information, and the product image extracted from the image retaining unit 47, through the communication processing units 46 and 36 to the cashier device 20. As a result, the product code, the screen layout information, and the product image transmitted by the maintenance processing unit 43 are stored in the panel information table 31 as panel registration information on the unspecified product.

In addition, an input screen illustrated in FIG. 5 is displayed on the display unit 12a. If the product-image selection button 57d is selected on the button setting screen 57, product images retained in the image retaining unit 47 are displayed, and a user selects one product image on the display.

The product extracting unit 45 extracts a product code and a product name of at least one product assumed to be the unspecified product on the basis of a section code and selling price information acquired, from information in the product information table 34 acquired by the communication processing unit 46, and causes the display unit 12a to display a product selection screen indicating the extracted product name of the at least one product. The product extracting unit 45 instructs the display processing unit 32 to cause the display unit 12a to display an input screen for the user to input the section code and the selling price information concerning the unspecified product in order to acquire these pieces of information.

Furthermore, on the product selection screen 65 illustrated in FIG. 6, the list 66 of product information extracted by the product extracting unit 45 from the information in the product information table 34 acquired by the communication processing unit 46 is displayed on the basis of the section code and the selling price information inputted through the input screen 61.

[Example of Operation]

Figure 7:
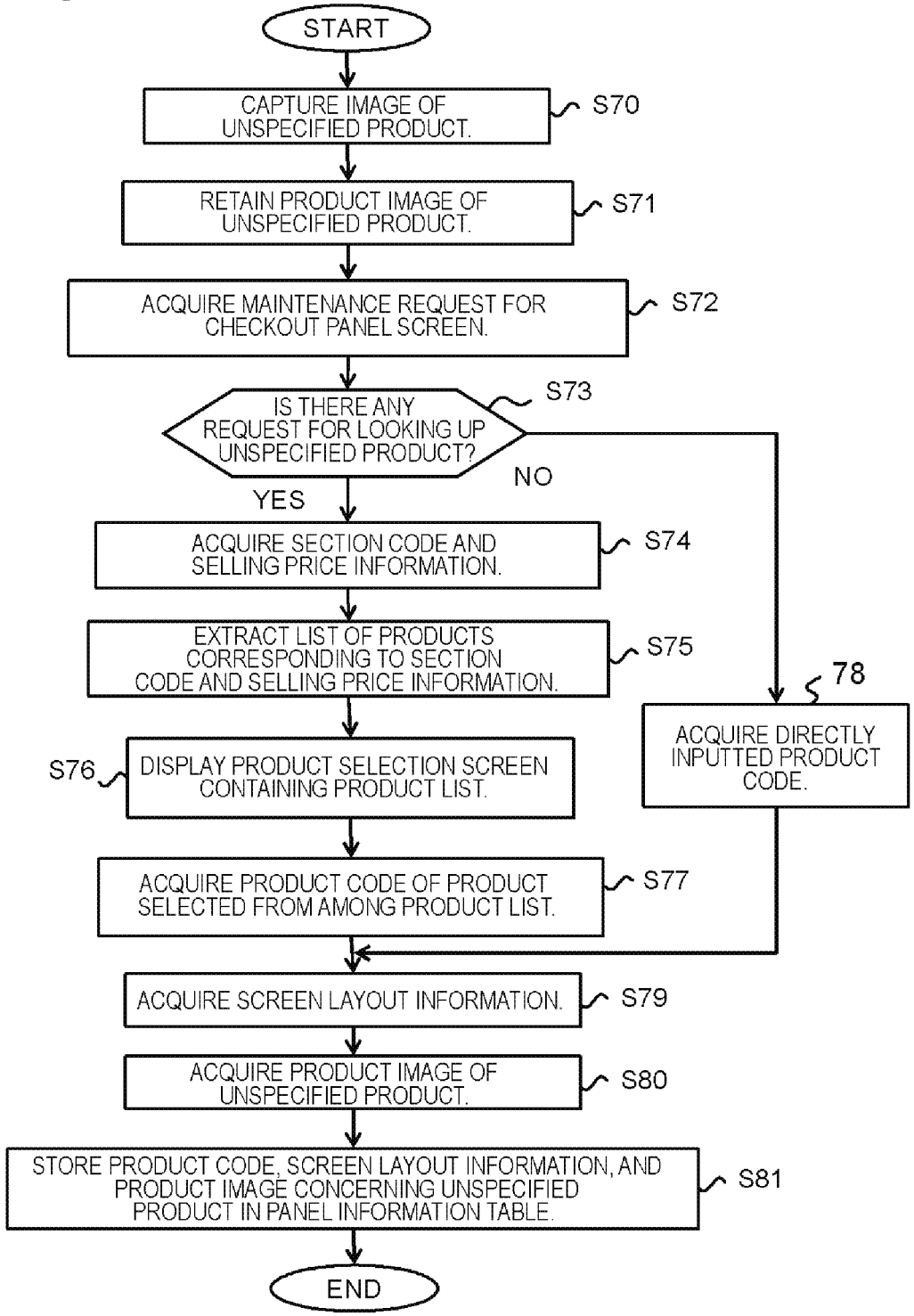
FIG. 7 is a flowchart showing an example of operations performed by the POS register device according to the first exemplary embodiment.

Below, a screen setting method according to the first exemplary embodiment will be described with reference to FIG. 7. FIG. 7 is a flowchart showing an example of operations performed by the POS register device 1 according to the first exemplary embodiment. The screen setting method according to the first exemplary embodiment relates to a setting method in connection with the checkout panel screen, and is performed by the checker device 10 or the cashier device 20 constituting the POS register device 1 according to the first exemplary embodiment. The POS register device 1 displays a checkout panel screen on which each screen part (each button) corresponding to each product displays a product image of the product and is arranged according to screen layout information on the basis of panel registration information on each product stored in the panel information table 31.

When registering an unlabeled product (unspecified product) that has not been registered on the checkout panel screen as an item to be checked out, the register operator instructs the POS register device 1 to capture an image of this unlabeled product. This instruction is made, for example, by the register operator operating the touch panel (12*b* or 22*b*) or the keyboard (11 or 21) of the POS register device 1.

In response to the instruction, the POS register device 1 captures an image of this unspecified product using the scanning device 13 or the handheld scanner 23 (S70). With this image capturing, a product image of this unspecified product is generated. The POS register device 1 retains the generated product image (S71).

The POS register device 1 acquires a maintenance request for the checkout panel screen made by a register operator (S72). This request takes place, for example, by the register operator pressing the maintenance button 55 in the example illustrated in FIG. 4 for registering the unspecified product described above to the checkout panel screen. With this operation, for example, the POS register device 1 displays the maintenance screen and the button setting screen as illustrated in FIG. 5 in order to acquire the product code, the screen layout information, and the product image concerning the unspecified product.

If the register operator directly inputs the product code of the unspecified product (S73; NO), the POS register device 1 acquires the directly inputted product code as the product code of the unspecified product (S78). On the other hand, if the register operator requests lookup for the unspecified product (S73; YES), the POS register device 1 operates in the following manner.

First, the POS register device 1 acquires a section code and selling price information (S74). These pieces of information are acquired from the register operator inputting the information on the input screen 61 (see FIG. 6) displayed by the POS register device 1. Then, the POS register device 1 extracts, from the product information table 34, a list of products corresponding to product information containing the section code and the selling price information acquired is extracted from the product information table 34 (S75). The POS register device 1 displays a product selection screen (see the reference character 65 in FIG. 6) containing the extracted product list (S76).

The register operator selects a product corresponding to the unspecified product from among the product list contained in this product selection screen. In response to the operation performed by the user, the POS register device 1 acquires the product code of the selected product as the product code of the unspecified product (S77).

Furthermore, the register operator operates this maintenance screen, the button setting screen, and the like to set screen layout information on the button corresponding to this unspecified product. With this operation, the POS register device 1 acquires the screen layout information concerning this unspecified product (S79).

Then, the POS register device 1 acquires a product image corresponding to this unspecified product from among product images retained (S80). This is realized, for example, by the register operator performing a selection operation to a screen displaying a list of product images retained.

The POS register device 1 stores, in the panel information table 31, the product code acquired in the step (S77) or the step (S78), the screen layout information acquired in the step (S79), and the product image acquired in the step (S80) as the panel registration information concerning this unspecified product (S81). As a result, on the basis of the panel registration information on this unspecified product stored in the panel information table 31, the POS register device 1 displays a checkout panel screen on which each screen part (each button) corresponding to the unspecified product displays the product image and is arranged according to screen layout information.

As described above, FIG. 7 shows an example in which the instruction to capture an image of an unspecified product (corresponding to S70) and the request to perform maintenance on a checkout panel screen (corresponding to S72) are separately performed. This corresponds to a case where an image of an unspecified product is captured at the time of registering the unspecified product as an item to be checked out, and maintenance of a checkout panel screen is performed after settlement of a transaction including this unspecified product is completed. However, the maintenance of the checkout panel screen may be performed when the unspecified product is registered as the item to be checked out. In such a case, it is only necessary that, after the step (S72) is performed, the step (S70) and the step (S71) are performed, and then, the step (S73) is performed.

[Operation and Effect of First Exemplary Embodiment]

In the first exemplary embodiment, an image of an unspecified product that has not been registered to the checkout panel screen for checking out products is captured by the scanning device 13 or the handheld scanner 23, and a product image generated on the basis of the captured image is retained in the image retaining unit 37. On the other hand, in connection with this unspecified product, a product code and screen layout information are acquired in the POS register device 1 on the basis of an operation performed by a user such as a register operator to an input screen displayed on the display unit 12*a* or the display unit 22*a* of the POS register device 1. With this operation, the product image, the product code, and the screen layout information concerning this unspecified product are stored in the panel information table 31. As a result, the product image is displayed on a screen part, corresponding to this unspecified product, of the display unit 12*a* or the display unit 22*a* of the POS register device 1, and at the same time, a checkout panel screen having the screen part arranged according to the screen layout information is displayed.

As described above, according to the first exemplary embodiment, it is possible to easily register the unlabeled product to the checkout panel screen through the POS register device 1 without operating the POS managing device placed at an office or other locations of a store. In addition, according to the first exemplary embodiment, since product images captured by the POS register device 1 can be registered to the checkout panel screen, it is possible to eliminate work load such as capturing a product image, for example, using a digital camera for the registration.

Furthermore, in the first exemplary embodiment, on the basis of the section code and the selling price information, a product selection screen containing a list of products assumed to be unspecified products is displayed on the display unit 12a or 22a of the POS register device 1. Moreover, in the POS register device 1, a product code of a product selected by a user on this product selection screen is acquired as the product code of the unspecified product. With this operation, in the case where a user does not know a product code of the unspecified product, the user can easily set the product code to the POS register device 1 by inputting the section code and the selling price that can be recognized more easily than the product code. This further makes it easy to perform the registration operation of the unspecified product to the checkout panel screen.

Second Exemplary Embodiment

In order to speedily complete cash register processing, a register operator quickly completes settlement of a transaction including unspecified products, and registers the unspecified products to the checkout panel screen during a time when no purchaser waits for checkout. Thus, there is a possibility that the register operator does not remember information on the unspecified products at the time of registration to the checkout panel screen. In the meanwhile, for reasons of tax laws or the like, the POS register device 1 keeps journal data serving as sales information on each transaction that has been completed through settlement processing.

Thus, in the POS register device 1 according to the second exemplary embodiment, information on an unspecified product can be identified on the basis of the journal data. Hereinbelow, the POS register device 1 according to the second exemplary embodiment will be described with focus being placed on things different from those in the first exemplary embodiment. In the following descriptions, things similar to those in the first exemplary embodiment will not be repeated as appropriate.

[Process Configuration]

Figure 8:
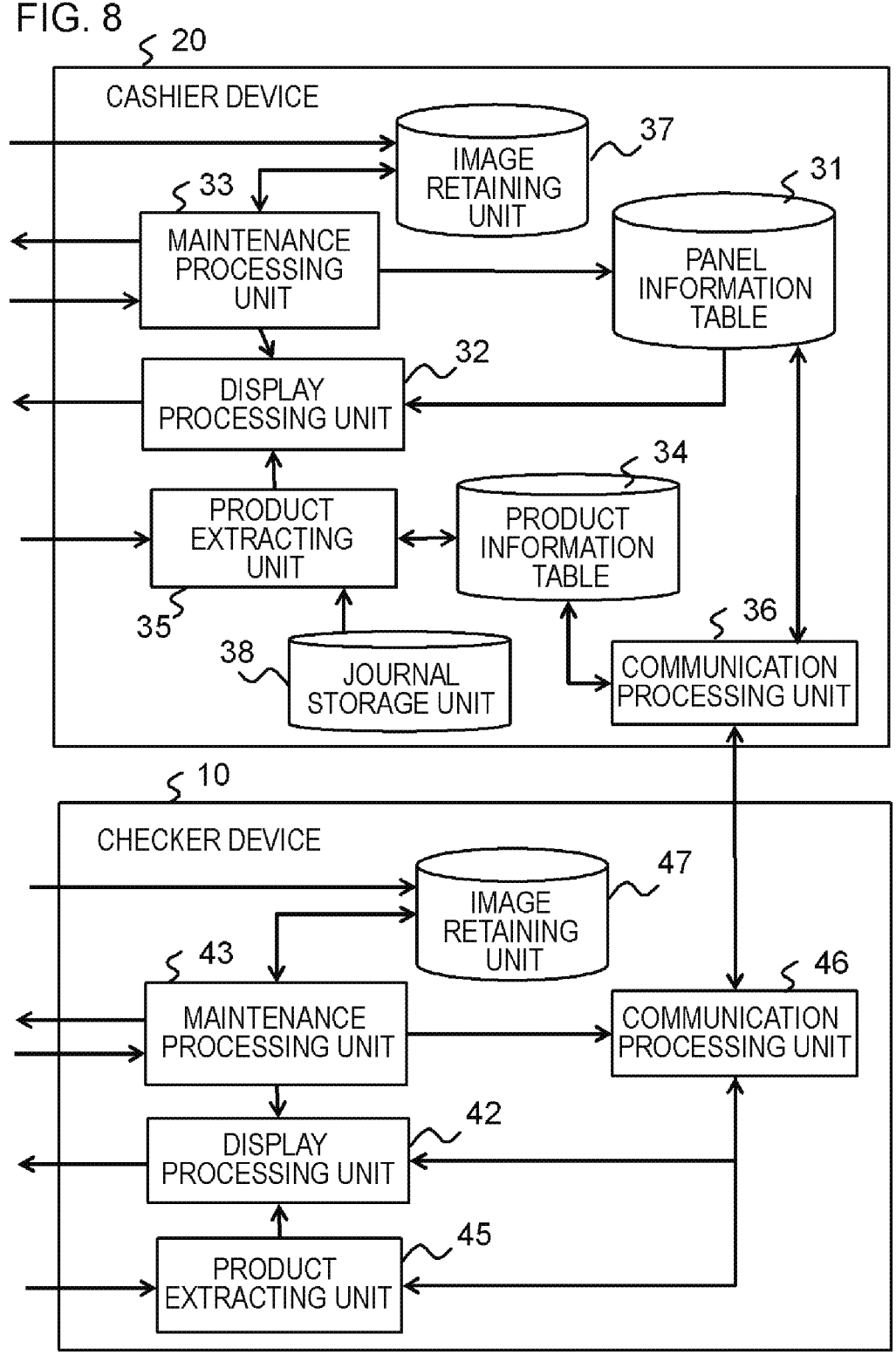
FIG. 8 is a diagram illustrating an example of a process configuration of a POS register device according to a second exemplary embodiment.

FIG. 8 is a diagram illustrating an example of a process configuration of the POS register device 1 according to the second exemplary embodiment. In addition to the configuration in the first exemplary embodiment, the cashier device 20 further includes a journal storage unit 38. As described above, in the cashier device 20, a processing unit, not illustrated, stores sales information on each transaction, for which settlement processing is completed, in the journal storage unit 38 as the journal data.

The journal storage unit 38 stores, for example, a receipt number, a cash-register number, a register operator number, settlement time, and sales information for each transaction for which settlement is completed. The sales information includes, for example, a product code, a product name, selling price information, and discount information for each product treated during the transaction.

The product extracting unit 35 of the cashier device 20 causes the display unit 22a to display a product selection screen showing the journal data acquired from the journal storage unit 38.

The product extracting unit 45 of the checker device 10 acquires the journal data stored in the journal storage unit 38 through the communication processing unit 36 and the communication processing unit 46, and causes the display unit 12a to display a product selection screen showing the journal data acquired.

Figure 9:
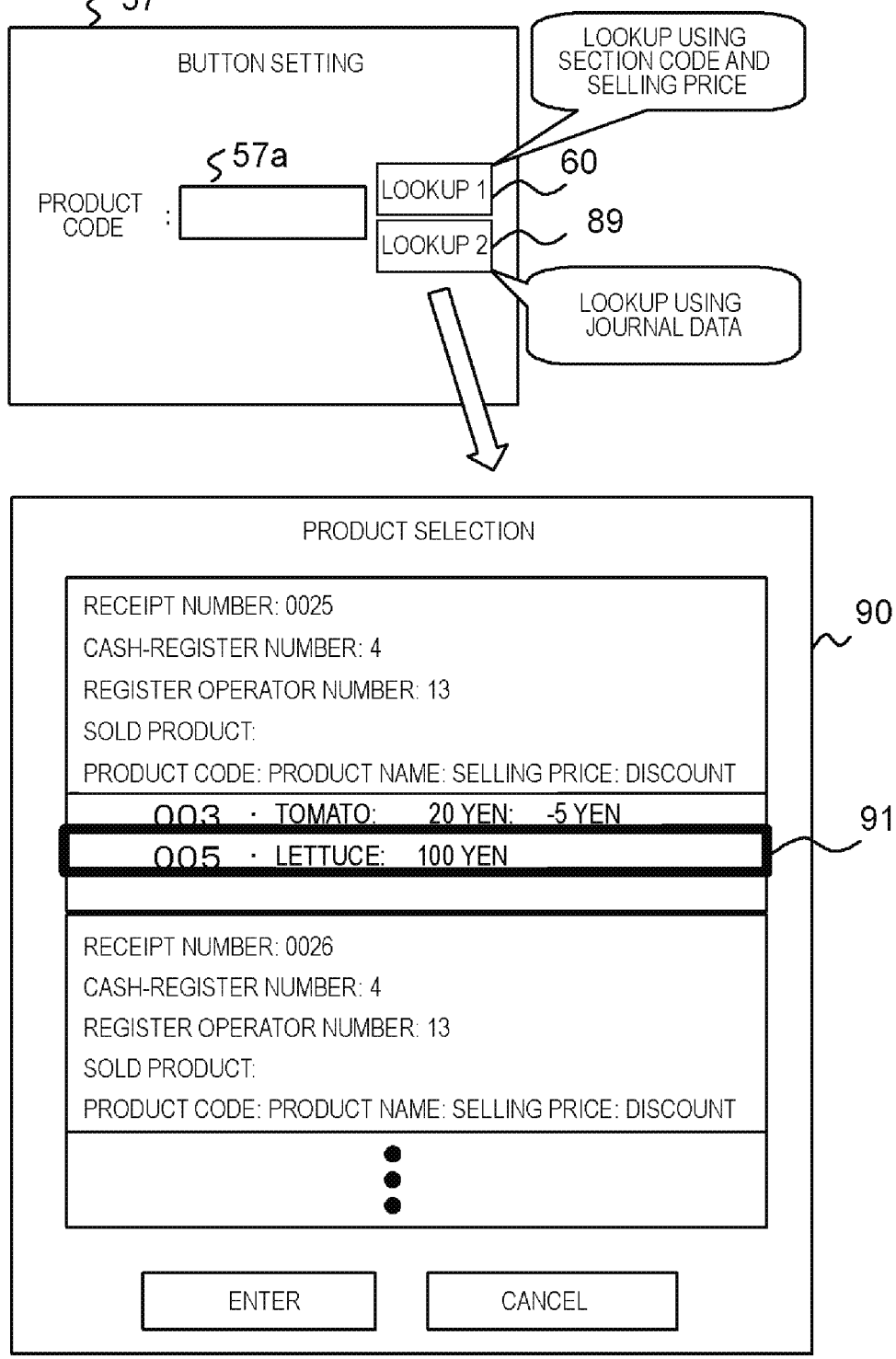
FIG. 9 is a diagram illustrating an example of a product selection screen according to the second exemplary embodiment.

FIG. 9 is a diagram illustrating an example of a product selection screen according to the second exemplary embodiment. In the second exemplary embodiment, two lookup buttons for a product code are provided on the button setting screen 57 described above. As described in the first exemplary embodiment, one lookup button 60 is a button with which a product code can be identified on the basis of the section code and the selling price information. If a lookup button 89, which is newly provided in the second exemplary embodiment, is pressed, a product selection screen 90 generated by the product extracting units 35 and 45 described above is displayed.

In the example illustrated in FIG. 9, journal data are displayed separately for each transaction. In this manner, the register operator can view information on past checkout through this product selection screen. With this configuration, the register operator can recognize again a product code of an unspecified product contained in a transaction for which settlement has been quickly completed. If an unspecified product (reference character 91) is selected from among sold products displayed on this product selection screen, a product code of the unspecified product selected is set in the product-code input box 57a on the button setting screen 57.

The maintenance processing units 33 and 43 acquire a product code of the sold product selected from among journal data on the product selection screen as described above, as the product code of the unspecified product.

[Example of Operation]

Figure 10:
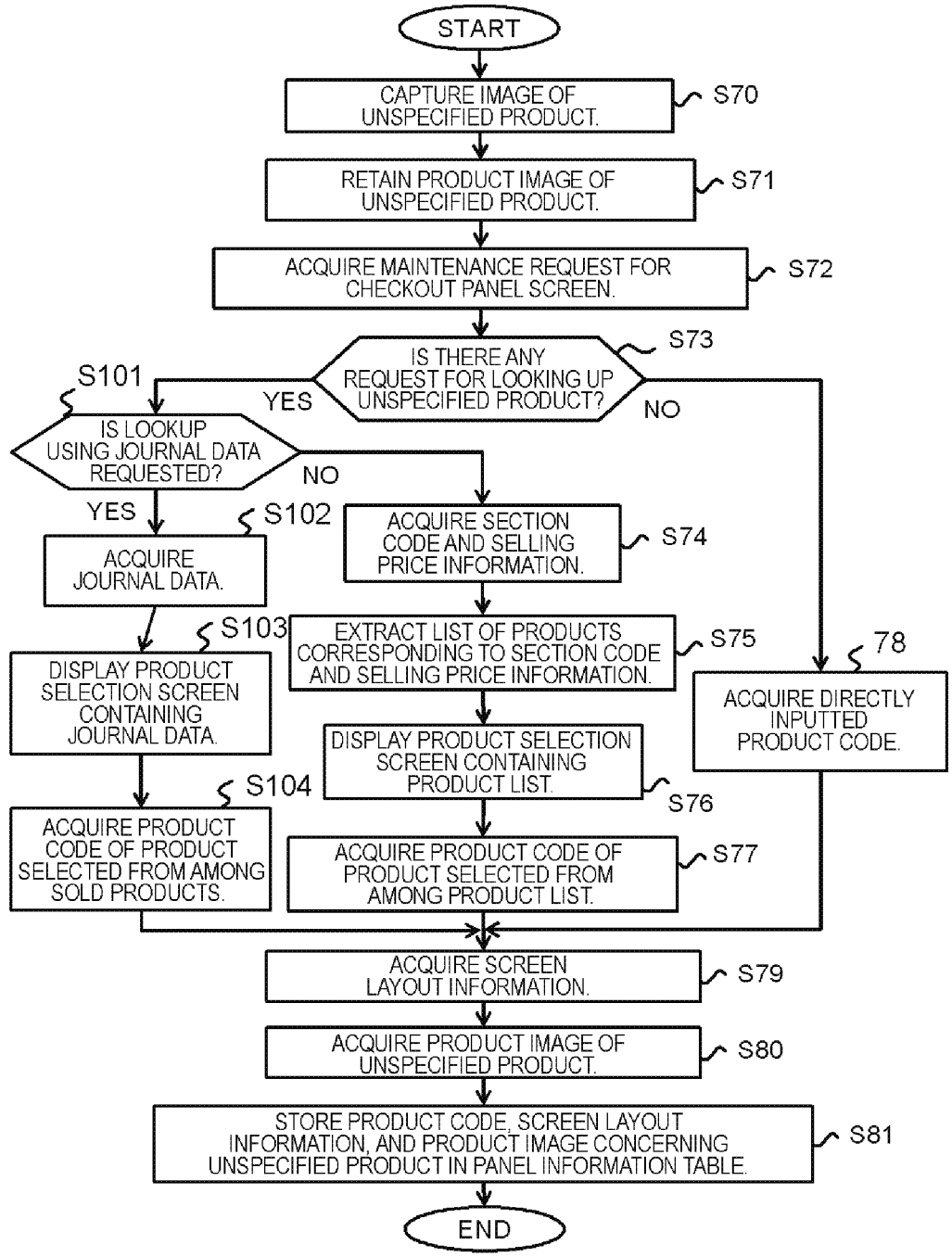
FIG. 10 is a flowchart showing an example of operations performed by the POS register device according to the second exemplary embodiment.

Below, a screen setting method according to the second exemplary embodiment will be described with reference to FIG. 10. FIG. 10 is a flowchart showing an example of operations performed by the POS register device 1 according to the second exemplary embodiment. In FIG. 10, the reference characters same as those in FIG. 7 are attached to the steps same as those in the example of operations according to the first exemplary embodiment. In the screen setting method according to the second exemplary embodiment, the step (S101) to the step (S104) are steps different from the first exemplary embodiment, and hence, only these steps will be described below.

If a register operator requests lookup for an unspecified product (S73; YES), the POS register device 1 judges whether lookup for the unspecified product using journal data is requested (S101). For example, it is judged whether the lookup button 89 indicated in an example of FIG. 9 is pressed. If lookup for the unspecified product using a section code and selling price information is requested (S101; NO), the POS register device 1 operates in a manner similar to the first exemplary embodiment.

On the other hand, if lookup for the unspecified product using the journal data is requested (S101; YES), the POS register device 1 acquires the journal data from the journal storage unit 38 (S102). The POS register device 1 displays a product selection screen containing the journal data on the display unit 12a or the display unit 22a (S103). The POS register device 1 acquires a product code of the product selected by the register operator from among sold products on this product selection screen as the product code of the unspecified product (S104). More specifically, in the POS register device 1, a record selected by the register operator is identified from among the sales information concerning the journal data, and the product code contained in this record is acquired.

After this, as in the first exemplary embodiment, the POS register device 1 stores, in the panel information table 31, a product code acquired in the step (S77), the step (S78) or the step (S104), screen layout information acquired in the step (S79), and a product image acquired in the step (S80) as panel registration information concerning this unspecified product (S81).

[Operation and Effect of Second Exemplary Embodiment]

In the second exemplary embodiment, the product selection screen containing the journal data is displayed on the display unit 12a or 22a of the POS register device 1, and the product code of the product selected by the user on this product selection screen is acquired as the product code of this unspecified product. With these operations, according to the second exemplary embodiment, it is possible to make the user (register operator) recognize again the product code of the unspecified product contained in a transaction for which settlement has been quickly completed. In other words, if the user does not remember a product code of the unspecified product when registering the unspecified product to the checkout panel screen, it is possible to easily set this product code to the POS register device 1. This further makes it easy to perform the registration operation of the unspecified product to the checkout panel screen.

Third Exemplary Embodiment

For register operators, preferred configurations of the checkout panel screen vary according to preferences or operational levels of the register operators.

Inexperienced register operators tend to prefer an easily understandable configuration, whereas experienced register operators tend to prefer a configuration that enables speedy operations. An example of the easily understandable configuration includes a configuration in which each screen element has a large size, and has a product image displayed thereon. An example of the configuration that enables speedy operations includes a configuration in which each screen element has a reduced size, and a lot of products can be viewed at one time. In the meanwhile, each register operator does not use one POS terminal in a fixed manner, and generally changes POS terminals according to working periods and shifts of the operator.

In view of the facts described above, a POS register device 1 according to the third exemplary embodiment enables to set and display a checkout panel screen for each register operator. Below, the POS register device 1 according to the third exemplary embodiment will be described with focus being placed on things different from those in the first exemplary embodiment and the second exemplary embodiment. In the following descriptions, details similar to those in the first exemplary embodiment and the second exemplary embodiment will not be repeated as appropriate.

[Process Configuration]

Figure 11:
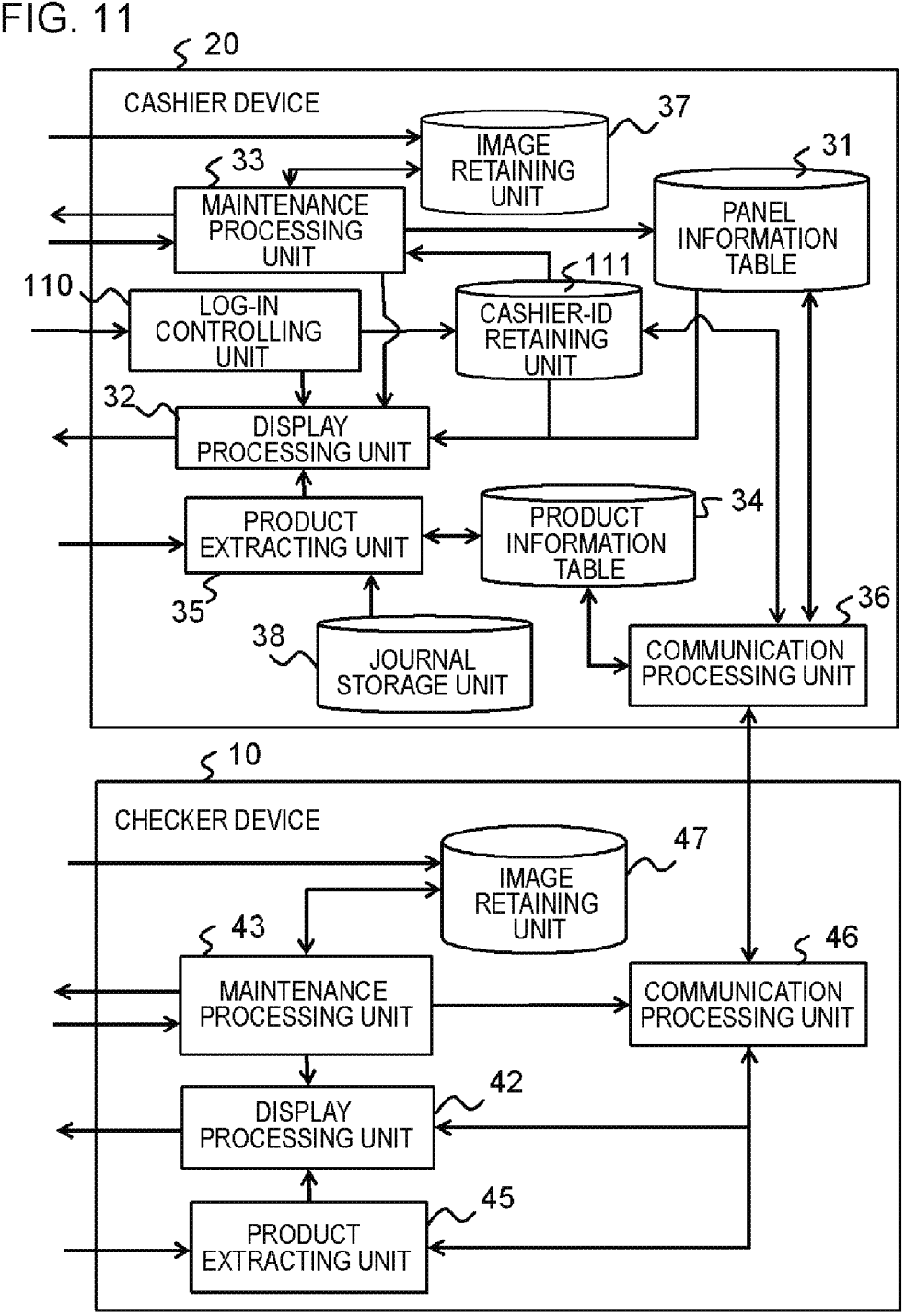
FIG. 11 is a diagram illustrating an example of a process configuration of a POS register device according to a third exemplary embodiment.

FIG. 11 is a diagram illustrating an example of a process configuration of the POS register device 1 according to the third exemplary embodiment. In addition to the configuration of the second exemplary embodiment, the cashier device 20 according to the third exemplary embodiment further includes a log-in controlling unit 110 and a cashier-ID retaining unit 111. The log-in controlling unit 110 and the cashier-ID retaining unit 111 are realized, for example, with the CPU 2 running a program stored in the memory 3.

The log-in controlling unit 110 controls login of a register operator to the POS register device 1. More specifically, the log-in controlling unit 110 instructs the display processing unit 32 to display a login screen, and acquires a cashier ID inputted by the register operator through operations on the login screen. The log-in controlling unit 110 retains the acquired cashier ID in the cashier-ID retaining unit 111. Note that the log-in controlling unit 110 may perform authentication of the register operator in the login control.

Here, the cashier ID is an identifier with which the POS register device 1 can identify each register operator, and is referred to as a register operator number in the second exemplary embodiment. Thus, the journal data stored in the journal storage unit 38 contains the cashier ID. Note that a method for inputting the cashier ID is not specifically limited. The cashier ID may be inputted through the keyboard 11 or 21, or the touch panel 12b or 22b, or may be acquired electronically, for example, using an electronic tag or a bar code.

The cashier-ID retaining unit 111 retains a cashier ID of a register operator who currently logs in. The cashier-ID retaining unit 111 may only retain the cashier ID of the register operator who currently logs in, or may retain plural cashier IDs in a manner that can identify the cashier ID of the register operator who currently logs in. Hereinafter, the cashier ID of the register operator who currently logs in is also referred to as a current cashier ID.

The panel information table 31 stores panel registration information for each cashier ID. In other words, the panel information table 31 stores the panel registration information on each product so as to be associated with each cashier ID.

The display processing unit 32 of the cashier device 20 acquires a current cashier ID from the cashier-ID retaining unit 111, extracts panel registration information corresponding to this current cashier ID from the panel information table 31, and cause the display unit 22a to display a checkout panel screen generated on the basis of the extracted panel registration information. Furthermore, the display processing unit 42 of the checker device 10 acquires the current cashier ID and the panel registration information corresponding to this current cashier ID through the communication processing unit 36 and the communication processing unit 46 from the cashier device 20, and causes the display unit 12a to display a checkout panel screen corresponding to this current cashier ID.

The maintenance processing unit 33 acquires the current cashier ID from the cashier-ID retaining unit 111, and stores panel registration information concerning an unspecified product in the panel information table 31 so as to be associated with this current cashier ID. The maintenance processing unit 43 stores the panel registration information concerning the unspecified product through the communication processing units 36 and 46 in the panel information table 31, in association with the current cashier ID acquired through the communication processing units 36 and 46.

The product extracting units 35 and 45 may cause the display unit 22a or 12a to display a product selection screen in which journal data acquired from the journal storage unit 38 are shown separately according to cashier IDs. In this case, the product extracting units 35 and 45 divide the acquired journal data according to the cashier IDs and include the journal data in the product selection screen in a state where the divided journal data are separated.

Figure 12:
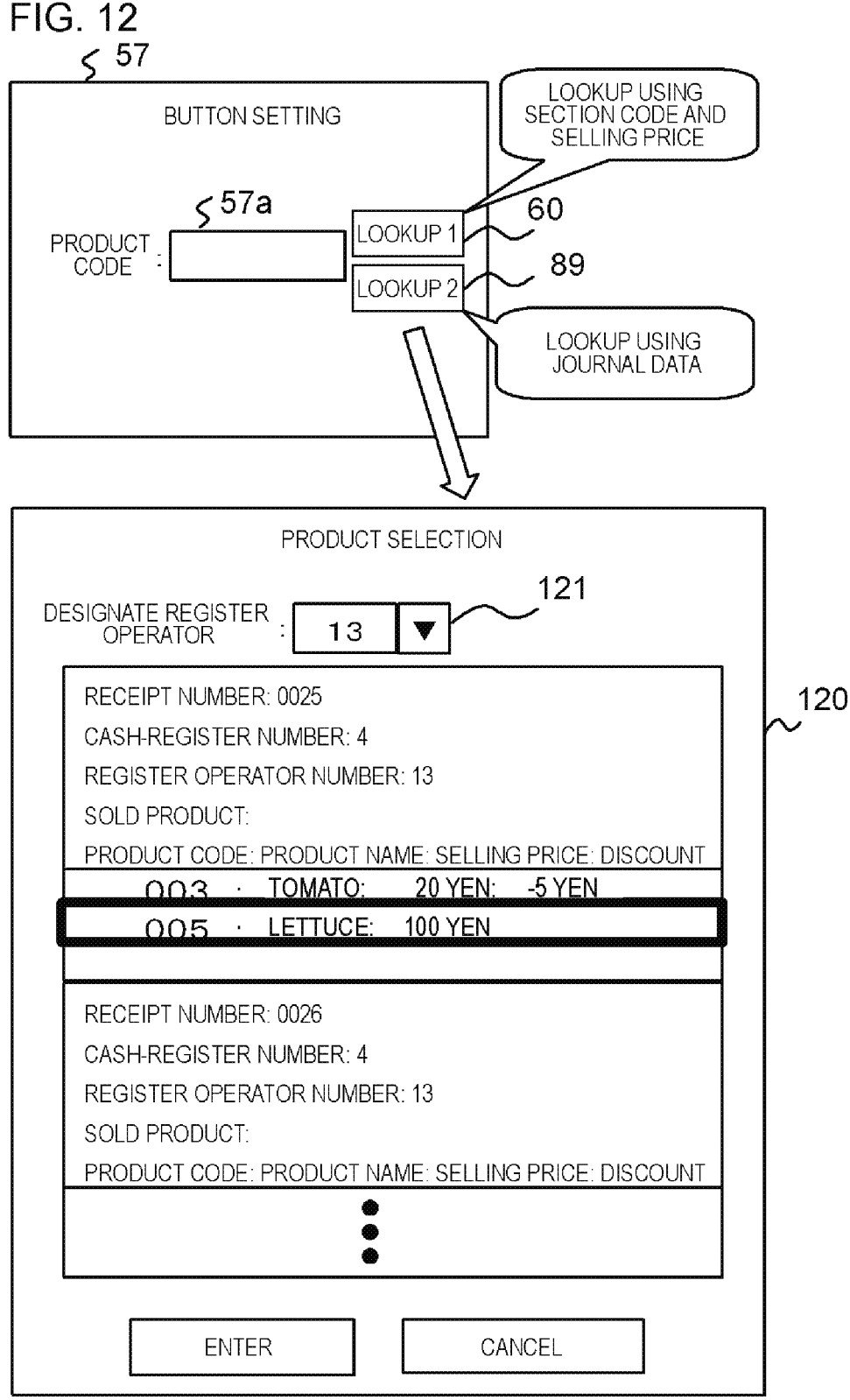
FIG. 12 is a diagram illustrating an example of a product selection screen according to the third exemplary embodiment.

FIG. 12 is a diagram illustrating an example of a product selection screen according to the third exemplary embodiment. As illustrated in FIG. 12, a product selection screen 120 according to the third exemplary embodiment is provided with a register-operator designating box 121. Journal data corresponding to a cashier ID designated in the register-operator designating box 121 are displayed on the product selection screen 120. With this configuration, by designating a cashier ID (register operator number) of another register operator in this register-operator designating box 121, a register operator can look up journal data concerning settlement processing performed by other register operators.

[Example of Operation]

Figure 13:
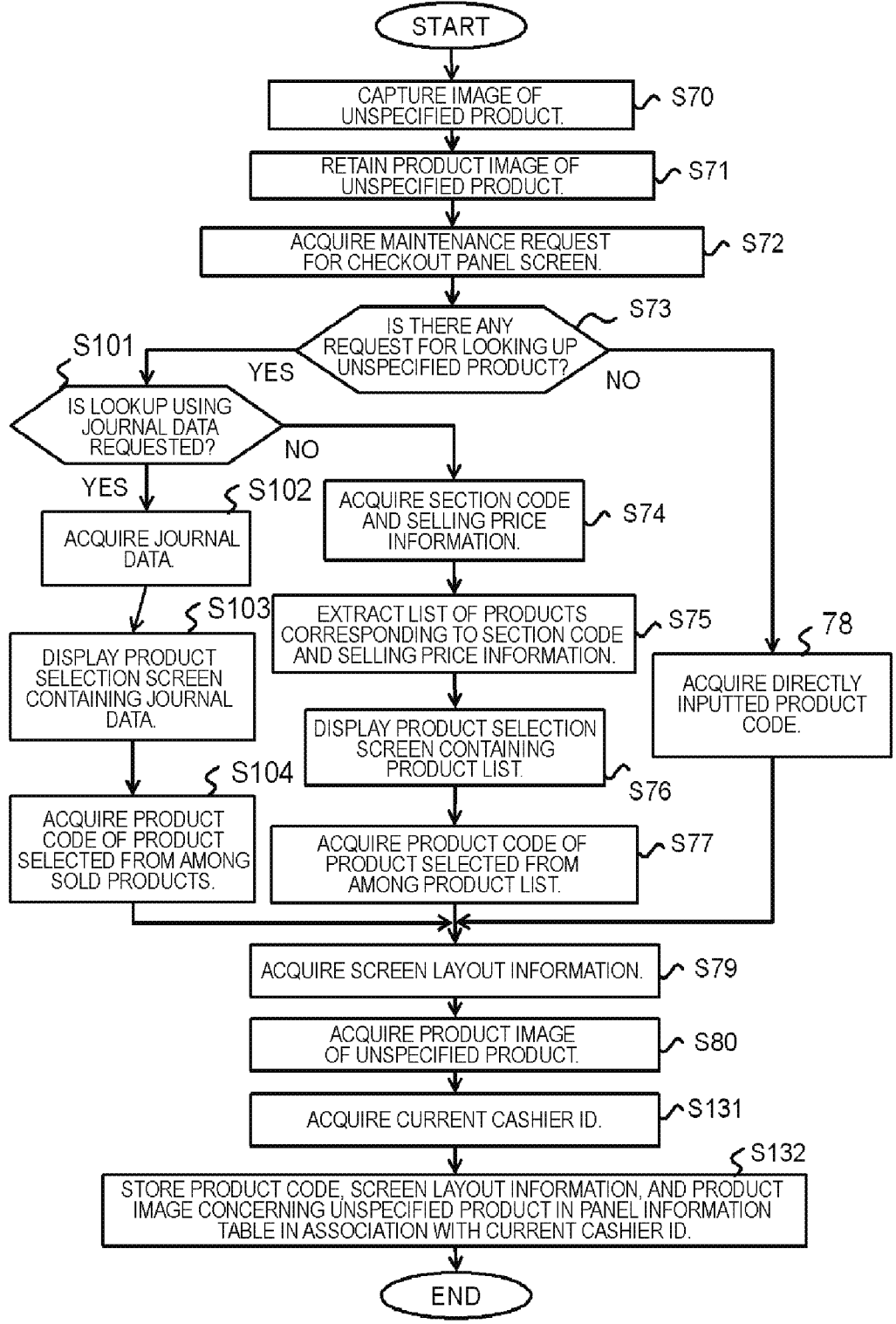
FIG. 13 is a flowchart showing an example of operations performed by the POS register device according to the third exemplary embodiment.

Below, a screen setting method according to the third exemplary embodiment will be described with reference to FIG. 13. FIG. 13 is a flowchart showing an example of operations performed by the POS register device 1 according to the third exemplary embodiment. The register operator has its own cashier ID, and first logs in to a POS register device 1 with this cashier ID when using the POS register device 1. With this operation, the POS register device 1 retains, in the cashier-ID retaining unit 111, the cashier ID of the register operator who is currently operating. In this state, the POS register device 1 operates in a manner shown in FIG. 13.

In FIG. 13, the reference characters same as those in FIG. 10 are attached to the same steps as those in the example of operations according to the second exemplary embodiment. In the screen setting method according to the third exemplary embodiment, the step (S131) and the step (S132) are steps different from those in the second exemplary embodiment, and hence, only the step (S131) and the step (S132) will be described below.

The POS register device 1 acquires a product image of an unspecified product (S80), and then, acquires a current cashier ID retained in the cashier-ID retaining unit 111 (S131). The POS register device 1 stores, in the panel information table 31, a product code acquired in the step (S77), the step (S78), or the step (S104), screen layout information acquired in the step (S79), a product image acquired in the step (S80) as panel registration information concerning this unspecified product, in a manner such that they are associated with the current cashier ID (S132).

[Operation and Effect of Third Exemplary Embodiment]

In the third exemplary embodiment, a cashier ID with which a register operator in operation can be identified is retained, and in the panel information table 31, panel registration information on each product is stored so as to be associated with the cashier ID. With these configurations, in the third exemplary embodiment, a checkout panel screen is displayed on the basis of the panel registration information corresponding to a cashier ID of a register operator who logs in. Furthermore, when an unspecified product is registered to the checkout panel screen, panel registration information on the unspecified product is stored in the panel information table 31 so as to be associated with the current cashier ID.

Thus, according to the third exemplary embodiment, it is possible to change a way of displaying the checkout panel screen for every register operator. With this configuration, each register operator can use a given POS register device 1 having a checkout panel screen that suits the register operator's preference. Thus, according to the third exemplary embodiment, it is possible to reduce operational loads of each register operator concerning the checkout panel screen, and improve operational efficiency of each register operator.

Fourth Exemplary Embodiment

Figure 14:
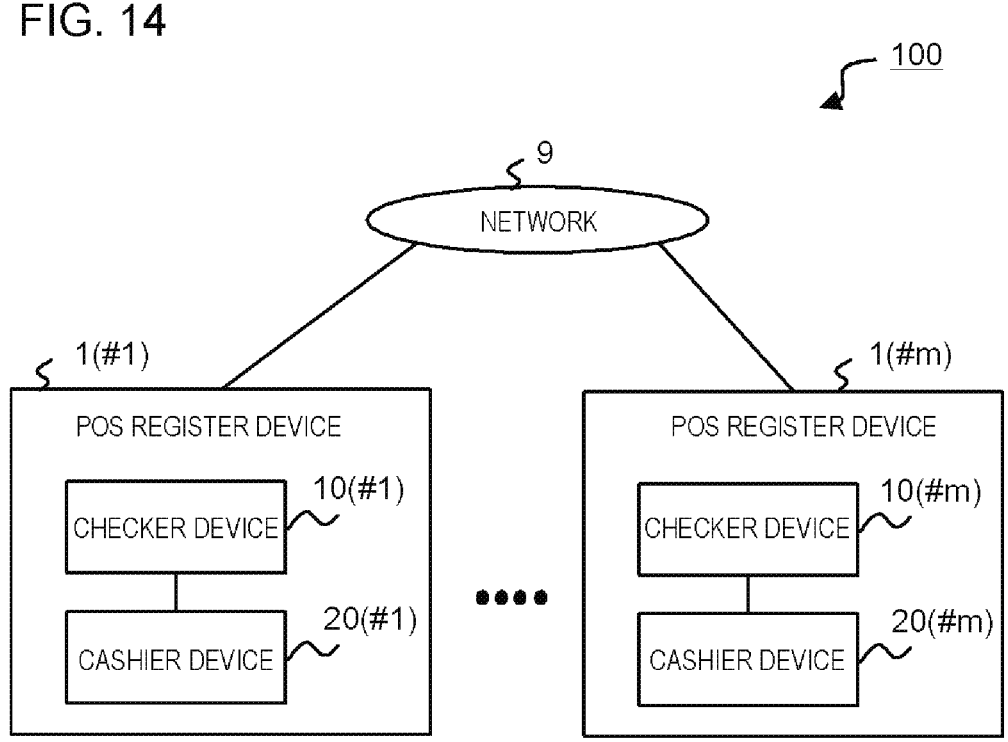
FIG. 14 is a diagram schematically illustrating an example of a configuration of a POS system according to a fourth exemplary embodiment.

FIG. 14 is a diagram schematically illustrating an example of a configuration of a POS system 100 according to a fourth exemplary embodiment. The POS system 100 includes plural POS register devices 1(#1) to 1(# m) according to each of the exemplary embodiments described above. These POS register devices 1(#1) to 1(# m) are connected through a network 9 in a manner that they can communicate with each other. The network 9 includes, for example, a local area network (LAN), a wireless communication network, a public network such as the Internet, and a wide area network (WAN). In this exemplary embodiment, a communication mode between the POS register devices 1 is not limited. Hereinbelow, the POS register devices 1(#1) to 1(# m) are collectively referred to as a POS register device 1 except when these need to be separately treated.

Below, the POS register device 1 according to the fourth exemplary embodiment will be described with focus being placed on things different from those in each of the exemplary embodiments described above. In the following descriptions, details similar to those in each of the exemplary embodiments described above will not be repeated as appropriate. The POS register device 1 according to the fourth exemplary embodiment has a process configuration similar to that of each of the exemplary embodiments described above.

The communication processing units 36 and 46 each have information on other POS register devices 1 necessary to communicate with the other POS register devices 1, and this information includes, for example, an Internet Protocol (IP) address. The communication processing units 36 and 46 each have information necessary for the communication, together with a register ID of each of the POS register devices 1. The register ID represents an identifier with which each of the POS register devices 1 can be identified, and is referred to as a cash-register number in the second exemplary embodiment.

The communication processing units 36 and 46 acquire, from another POS register device 1, journal data as well as a register ID with which this other POS register device 1 can be identified. The journal data acquired from the other POS register device 1 is referred to as external journal data. Thus, the communication processing units 36 and 46 are also called external-journal acquiring units.

Furthermore, the communication processing units 36 and 46 distribute at least one piece of panel registration information from among panel registration information stored in the panel information table 31 together with a corresponding cashier ID to another POS register device 1. For example, if the panel registration information is updated, the communication processing units 36 and 46 perform this distribution processing concerning the updated panel registration information. Thus, the communication processing units 36 and 46 are also called distributing units.

Once receiving the panel registration information and the cashier ID from another POS register device 1, the communication processing units 36 and 46 store, in the panel information table 31, the panel registration information and the cashier ID so as to be associated with each other. At this time, in the case where panel registration information, which is associated with a cashier ID the same as the cashier ID acquired from the other POS register device 1, is already stored in the panel information table 31, the existing panel registration information is overwritten with the panel registration information acquired from the other POS register device 1.

The journal storage unit 38 stores journal data indicating information on a sold product for which settlement processing is performed by the POS register device 1 itself, and external journal data acquired from another POS register device 1 in a manner such that these data are associated with each register ID.

The product extracting units 35 and 45 cause the display unit 12a or 22a to display a product selection screen showing external journal data acquired by the communication processing unit 36 or 46, and journal data stored in the journal storage unit 38 in a separated form. In this case, the product extracting units 35 and 45 extract the journal data of the POS register device 1 itself and the external journal data from the journal storage unit 38, identify these data on the basis of register IDs, and make the journal data contained in the product selection screen in a manner that the journal data are separated according to the identified register IDs.

Figure 15:
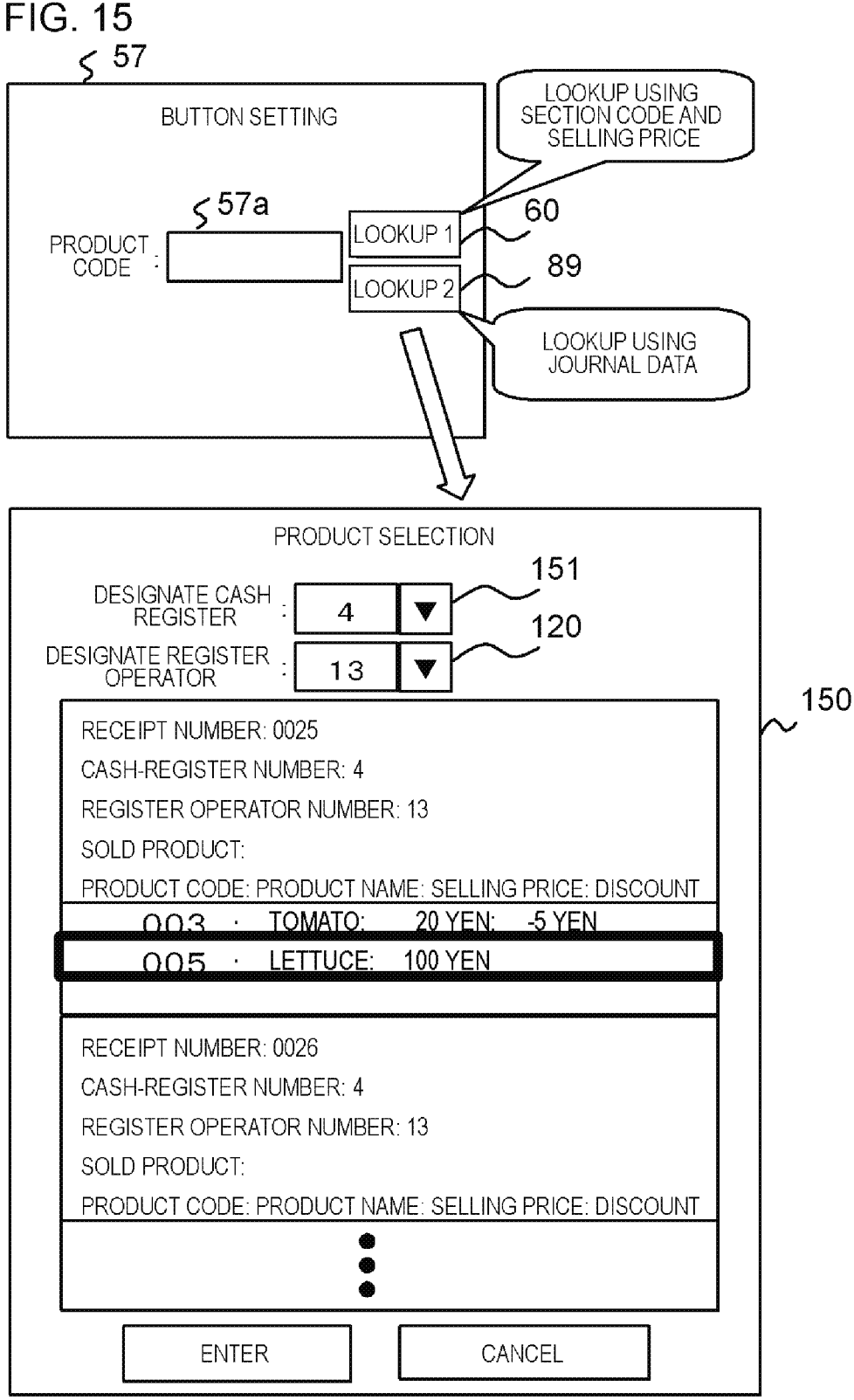
FIG. 15 is a diagram illustrating an example of a product selection screen according to the fourth exemplary embodiment.

FIG. 15 is a diagram illustrating an example of a product selection screen according to the fourth exemplary embodiment. As illustrated in FIG. 15, a cash-register specifying box 151 is newly provided to a product selection screen 150 according to the fourth exemplary embodiment. On this product selection screen 150, only the journal data corresponding to a register ID designated in the cash-register specifying box 151 is displayed. In the case where a register ID designated in the cash-register specifying box 151 indicates another POS register device 1, a POS register device 1 according to the fourth exemplary embodiment may instruct the communication processing unit 36 or the communication processing unit 46 to acquire the journal data from this other POS register device 1 corresponding to the designated register ID. With this configuration, a register operator looks up the journal data of the other POS register device 1, and can identify a product code of an unspecified product that should be registered to the checkout panel screen.

[Operation and Effect of Fourth Exemplary Embodiment]

In the fourth exemplary embodiment, journal data indicating information on a sold product for which settlement processing is performed by another POS register device 1 are acquired together with a register ID of this other POS register device 1, and journal data are displayed on a product selection screen in a state where the journal data are separated according to register IDs. With this configuration, a register operator can look up the journal data of another POS register device 1 different from the POS register device 1 that the register operator is currently using, and can identify, on the basis of the journal data, a product code of an unspecified product that should be registered to the checkout panel screen. Thus, if the unspecified product has been already checked out with a correct product code in another POS register device 1, the register operator can know the product code of this unspecified product on the basis of this external journal data.

Furthermore, in the fourth exemplary embodiment, in the case where a checkout panel screen is updated in a certain POS register device 1, updated panel registration information together with a cashier ID is distributed to other POS register devices 1, and panel information table 31 of each of the other POS register devices 1 is updated on the basis of the distributed panel registration information. With this configuration, a register operator, by setting a checkout panel screen in a certain POS register device 1 so as to fit his or her preference, can use a similar checkout panel screen in other POS register devices 1. As a result, according to the fourth exemplary embodiment, it is possible to eliminate the operation of setting a similar checkout panel screen to plural POS register devices 1, and hence, it is possible to reduce work load of this setting operation.

Modification Example

In each of the exemplary embodiments described above, an example in which the POS register device 1 includes the checker device 10 and the cashier device 20 has been given. However, the POS register device 1 may be configured to only include the cashier device 20. Furthermore, in each of the exemplary embodiment described above, the checkout panel screen can be displayed on the checker device 10 as well as the cashier device 20. However, it may be possible to employ a configuration in which the checkout panel screen can be displayed on either one of the checker device 10 and the cashier device 20.

Furthermore, in each of the exemplary embodiments described above, the panel information table 31, the product information table 34, the journal storage unit 38, and the cashier-ID retaining unit 111 are provided only to the cashier device 20. However, copies of them may be provided to the checker device 10. In this case, each of the processing units in the checker device 10 does not have to acquire information, which is to be stored in each of these processing units through the communication processing units 36 and 46.

In addition, in each of the exemplary embodiments described above, a product image is captured also by the handheld scanner 23 of the cashier device 20. However, it may be possible to employ a configuration in which only the scanning device 13 of the checker device 10 captures the product image. In this case, it is only necessary to employ a configuration in which the checker device 10 transmits the product image generated by the scanning device 13 to the cashier device 20, and the cashier device 20 retains the product image, received from the checker device 10, in the image retaining unit 37.

Moreover, the POS register device 1 according to each of the exemplary embodiments described above may be realized as a POS system including a server device and a store terminal.

Figure 16:
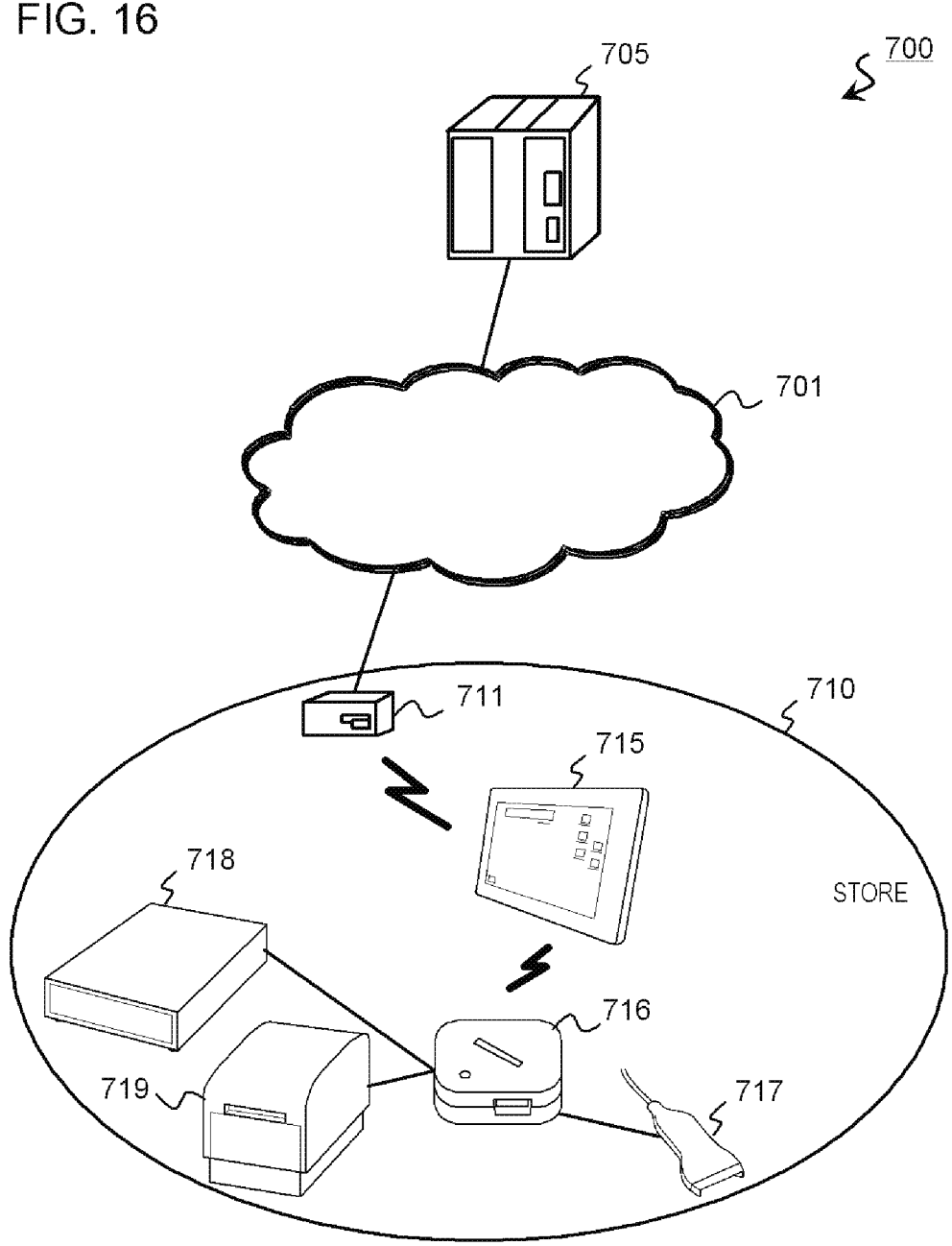
FIG. 16 is a diagram schematically illustrating an example of a configuration of a POS system according to a modification example.

FIG. 16 is a diagram schematically illustrating an example of a configuration of a POS system 700 according to a modification example.

The POS system 700 is configured to include a server device 705 and a store-side configuration 710, and the server device 705 and the store-side configuration 710 are connected through a communication network 701 in a manner that they can communicate with each other. The communication network 701 includes, for example, a public network such as the Internet, a wide area network (WAN), a local area network (LAN), and a wireless communication network. The way in which the communication network 701 is realized is not limited.

The store-side configuration 710 includes, for example, a communication relaying device 711, a store terminal 715, a stand 716, a handheld scanner 717, a cash drawer 718, and a receipt printer 719. The stand 716 is a device for connecting the store terminal 715 with other units (the handheld scanner 717, the cash drawer 718, and the receipt printer 719) in a manner that they can communicate with each other. The store terminal 715 and the stand 716 are connected, for example, through a short-range wireless communication such as Bluetooth (registered trademark) and an infrared communication, or a wireless LAN. The stand 716 and other units are connected through various types of communication lines or wireless communication. The communication relaying device 711 connects the store terminal 715 with the communication network 701, which enables communication between the store terminal 715 and the server device 705. Note that communication modes between these nodes are not limited. It may be possible to employ a configuration in which the communication relaying device 711 is omitted, and the store terminal 715 is connected to the communication network 701 using a 3G communication system, for example, through a wireless base station without passing through the communication relaying device 711.

The store terminal 715 is a general purpose computer such as a personal computer (PC), a laptop PC, a tablet-type terminal, and a smartphone, and communicates data with the server device 705, thereby achieving a user interface of the POS register device 1 described above. The server device 705 is a general server computer, and is realized, for example, as a WEB server or an application server.

In the case where the POS register device 1 according to the exemplary embodiments described above is realized as the POS system 700 as described above, each of the processing units described above may be realized in either the server device 705 or the store terminal 715, as long as it can be realized. For example, in the case where a WEB system is used as an interface between the server device 705 and the store terminal 715, it may be possible to realize all of the processing units described above in the server device 705, and operate the store terminal 715 as merely a display (and an image capturing unit). On the contrary, it may be possible to realize all the processing units within the store terminal 715. Furthermore, it may be possible to realize part of the processing units in the server device 705, and realize the remaining processing units in the store terminal 715. For example, it may be possible to realize the panel information table 31 and the product information table 34 in the server device 705, and realize the other processing units in the store terminal 715.

As described above, it is not excluded that the information processing device according to the present invention is realized with plural devices (plural computers, or a body including plural CPUs). The information processing device according to the present invention may be realized with a combination of the checker device 10 and the cashier device 20 according to each of the exemplary embodiments described above, or may be realized with a combination of the server device 705 and the store terminal 715 according to this modification example. Needless to say, the information processing device according to the present invention may be realized only with the cashier device 20 according to each of the exemplary embodiments described above, or may be realized merely with the server device 705 or the store terminal 715 according to the modification example.

Furthermore, in the plural flowcharts used in the descriptions above, plural steps (processes) are described in a sequential order. However, the order of the steps performed in each of the exemplary embodiments is not limited to the order of the steps described. In each of the exemplary embodiments, the order of the steps illustrated in the drawings may be exchanged, provided that the exchange does not impair the details of the processes. In addition, the above-described exemplary embodiments and the modification example may be combined, provided that the details thereof do not contradict each other.

The present application claims priority based on Japanese Patent Application No. 2012-173402 filed on Aug. 3, 2012, the disclosures of which are incorporated herein in their entirety.

The invention claimed is:

1. An information processing device, comprising:
an image memory configured to store a product image of an unlabeled product;
a panel information memory configured to store:
panel registration information including a product code, a product image, and screen layout information for each of labeled products; and
product information of one or more unlabeled products, including product codes, product names, section codes, and selling price information corresponding to the one or more unlabeled products, the section codes being configured to identify categories of the one or more unlabeled products;
a display panel configured to display a checkout panel screen having screen parts, each of the screen parts including the product image of each of the labeled products; and
a hardware processor configured to:
control the display panel to display the screen parts based on the screen layout information;
acquire the product image of the unlabeled product from the image memory;
acquire, via a user interface, screen layout information of the unlabeled product, the screen layout information of the unlabeled product being set based on user selection and associated with display of the product image of the unlabeled product;
extract product information on at least one of the one or more unlabeled products estimated to be the unlabeled product on the basis of the section codes and the selling price information;
cause the display panel to display a product selection screen showing the extracted information;
acquire a user-selected product code from the extracted information shown on the product selection screen, as the product code of the unlabeled product to be stored in the panel information memory in association with the product image and the screen layout information of the unlabeled product;
store the product image, the product code, and the screen layout information of the unlabeled product in the panel information memory; and
control the display panel to display a first screen part corresponding to the unlabeled product, the first screen part including the stored product image in the panel information memory.

2. The information processing device according to claim 1, wherein:
the panel information memory is further configured to store internal journal data including information on sold products related to each transaction for which settlement processing is completed in the information processing device; and
the hardware processor is further configured to:
cause the display panel to display a product selection screen showing the internal journal data, and
acquire the user-selected product code based on the internal journal data shown on the product selection screen.

3. The information processing device according to claim 2, wherein
the internal journal data includes a cashier ID with which a register operator can be identified, and
the hardware processor is further configured to cause the display panel to display the product selection screen in which the internal journal data are shown separately according to the cashier ID.

4. The information processing device according to claim 2, wherein the hardware processor is further configured to:
  acquire external journal data indicating information on sold products for which settlement processing is performed by another information processing device, together with a register ID with which said another information processing device can be identified, and
  cause the display panel to display the product selection screen in which the internal journal data and the external journal data are shown separately using the register ID.

5. The information processing device according to claim 1, wherein:
  the panel information memory is further configured to:
    store the panel registration information according to one or more cashier IDs, and
    retain a current cashier ID associated with a register operator currently operating the information processing device; and
  the hardware processor is further configured to:
    extract a portion of the panel registration information corresponding to the current cashier ID,
    cause the display panel to display the checkout panel screen in which the screen parts are arranged on the basis of the extracted portion of the panel registration information, and
    form a corresponding relationship between the unlabeled product with the current cashier ID.

6. The information processing device according to claim 5, wherein the hardware processor is further configured to distribute, to another information processing device, at least one piece of the panel registration information, together with a corresponding cashier ID.

7. The information processing device according to claim 1, wherein the screen layout information for each of the labeled products indicates a position at which a screen part associated with a corresponding labeled product is placed in the checkout panel screen.

8. The information processing device according to claim 1, wherein the screen layout information for each of the labeled products indicates a display size of a screen part associated with a corresponding labeled product in the checkout panel screen.

9. The information processing device according to claim 1, wherein the screen layout information for each of the labeled products indicates: a position at which a screen part associated with a corresponding product is placed in the checkout panel screen; and a display size of the screen part associated with the corresponding labeled product in the checkout panel screen.

10. The information processing device according to claim 1, wherein the checkout panel screen is displayed when registering products to be paid for.

11. An information processing method, comprising:
  storing, in an image memory, a product image of an unlabeled product;
  storing, in a panel information memory, panel registration information including a product code, a product image, and screen layout information for each of labeled products;
  storing, in the panel information memory, product information of one or more unlabeled products, including product codes, product names, section codes, and selling price information corresponding to the one or more unlabeled products, the section codes being configured to identify categories of the one or more unlabeled products;
  displaying, on a display panel, a checkout panel screen having screen parts, each of the screen parts including the product image of each of the labeled products; and
  controlling the display panel to display the screen parts based on the screen layout information;
  acquiring the product image of the unlabeled product from the image memory;
  acquiring, via a user interface, screen layout information of the unlabeled product, the screen layout information of the unlabeled product being set based on user selection and associated with display of the product image of the unlabeled product;
  extracting product information on at least one of the one or more unlabeled products estimated to be the unlabeled product on the basis of the section codes and the selling price information;
  causing the display panel to display a product selection screen showing the extracted information;
  acquiring a user-selected product code from the extracted information shown on the product selection screen, as the product code of the unlabeled product to be stored in the panel information memory in association with the product image and the screen layout information of the unlabeled product;
  storing the product image, the product code, and the screen layout information of the unlabeled product in the panel information memory; and
  controlling the display panel to display a first screen part corresponding to the unlabeled product, the first screen part including the stored product image in the panel information memory.

12. A non-transitory computer-readable storage medium storing a program which, when executed, causes an information processing device to perform a method for information processing, comprising:
  storing, in an image memory, a product image of an unlabeled product;
  storing, in a panel information memory, panel registration information including a product code, a product image, and screen layout information for each of labeled products;
  storing, in the panel information memory, product information of one or more unlabeled products, including product codes, product names, section codes, and selling price information corresponding to the one or more unlabeled products, the section codes being configured to identify categories of the one or more unlabeled products;
  displaying, on a display panel, a checkout panel screen having screen parts, each of the screen parts including the product image of each of the labeled products; and
  controlling the display panel to display the screen parts based on the screen layout information;
  acquiring the product image of the unlabeled product from the image memory;
  acquiring, via a user interface, screen layout information of the unlabeled product, the screen layout information of the unlabeled product being set based on user selection and associated with display of the product image of the unlabeled product;
  extracting product information on at least one of the one or more unlabeled products estimated to be the unlabeled product on the basis of the section codes and the selling price information;
  causing the display panel to display a product selection screen showing the extracted information;

acquiring a user-selected product code from the extracted information shown on the product selection screen, as the product code of the unlabeled product to be stored in the panel information memory in association with the product image and the screen layout information of the unlabeled product;

storing the product image, the product code, and the screen layout information of the unlabeled product in the panel information memory; and controlling the display panel to display a first screen part corresponding to the unlabeled product, the first screen part including the stored product image in the panel information memory.

\* \* \* \* \*